United States Patent
Kondo

(10) Patent No.: US 8,204,674 B2
(45) Date of Patent: Jun. 19, 2012

(54) APPARATUS FOR CONTROLLING ENGINE USING CRANK SIGNAL AND CAM SIGNAL

(75) Inventor: Haruhiko Kondo, Kasugai (JP)

(73) Assignee: Denso Corporation, Kariya (JP)

( * ) Notice: Subject to any disclaimer, the term of this patent is extended or adjusted under 35 U.S.C. 154(b) by 703 days.

(21) Appl. No.: 12/424,945

(22) Filed: Apr. 16, 2009

(65) Prior Publication Data

US 2009/0265079 A1   Oct. 22, 2009

(30) Foreign Application Priority Data

Apr. 17, 2008 (JP) ................................. 2008-107854

(51) Int. Cl.
*G06F 19/00* (2011.01)
*G06F 11/07* (2006.01)
*G01M 15/02* (2006.01)
*F02P 5/15* (2006.01)

(52) U.S. Cl. ..... 701/114; 701/110; 702/185; 73/114.26; 123/406.18

(58) Field of Classification Search ............. 123/406.13, 123/406.18, 406.58–406.63, 479; 701/101–103, 701/110, 111, 114, 115; 73/114.26–114.28; 702/182, 183, 185, 186
See application file for complete search history.

(56) References Cited

U.S. PATENT DOCUMENTS

| | | | | |
|---|---|---|---|---|
| 3,972,230 A | * | 8/1976 | Hanson et al. ............. | 73/114.05 |
| 4,502,446 A | * | 3/1985 | Kanegae et al. ............ | 123/479 |
| 5,201,296 A | * | 4/1993 | Wunning et al. ............ | 123/479 |
| 5,311,771 A | * | 5/1994 | Young ........................ | 73/114.26 |
| 5,671,145 A | * | 9/1997 | Krebs et al. ................. | 701/102 |
| 6,473,687 B2 | * | 10/2002 | Ando .......................... | 701/114 |
| 7,197,391 B2 | * | 3/2007 | Kunibe et al. ............... | 701/114 |
| 7,428,459 B2 | * | 9/2008 | Kondo ......................... | 701/114 |
| 7,819,106 B2 | * | 10/2010 | Kondo ......................... | 701/114 |
| 2002/0078925 A1 | | 6/2002 | Kobayashi | |
| 2006/0167615 A1 | | 7/2006 | Kunibe et al. | |
| 2007/0175272 A1 | | 8/2007 | Kondo | |

FOREIGN PATENT DOCUMENTS

| | | |
|---|---|---|
| JP | 09-152902 | 6/1997 |
| JP | 2000-104619 | 4/2000 |
| JP | 2002-195092 | 7/2002 |
| JP | 2006-200484 | 8/2006 |
| JP | 2007-205242 | 8/2007 |
| JP | 2007205242 A * | 8/2007 |

OTHER PUBLICATIONS

Japanese Office Action dated Mar. 2, 2010, issued in corresponding Japanese Application No. 2008-107854, with English translation.

* cited by examiner

*Primary Examiner* — Willis Wolfe, Jr.
(74) *Attorney, Agent, or Firm* — Nixon & Vanderhye PC

(57) ABSTRACT

In an apparatus for controlling an engine, an input switching unit switches an input signal to be inputted to an input path from a crank signal to a cam signal when it is determined that the crank signal is abnormal. An event signal generating unit generates a crank-input event signal while it is determined that the crank signal is abnormal by an abnormality determining unit. The crank-input event signal has a level that repetitively changes in a predetermined direction. Each level change of the crank-input event signal is synchronized with a corresponding level change of the crank signal. A monitoring unit monitors a level change of the crank-input event signal while it is determined that the crank signal is abnormal by the abnormality determining unit.

5 Claims, 17 Drawing Sheets

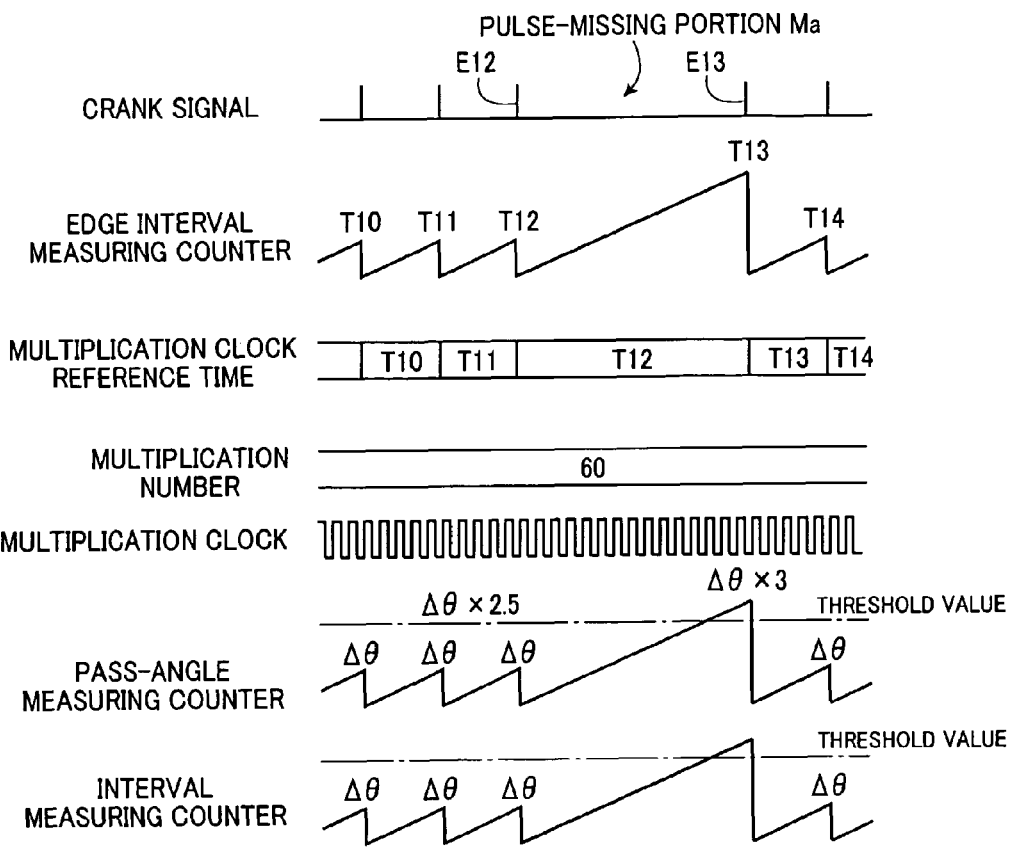
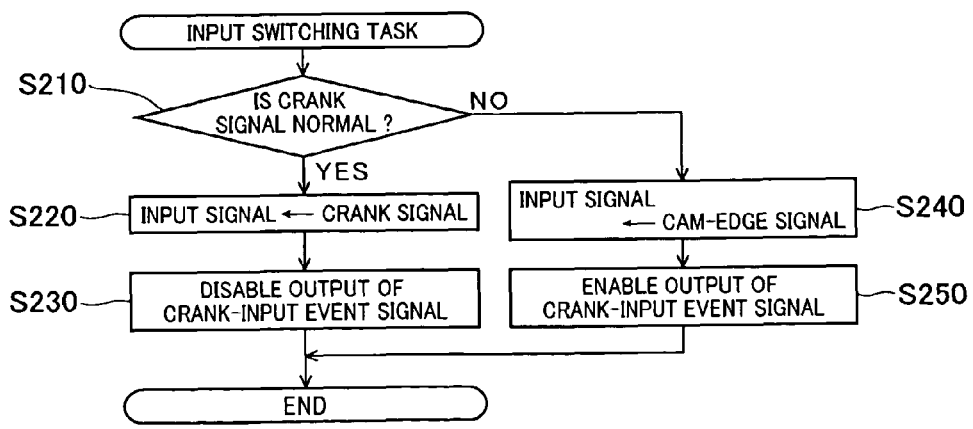

FIG.15

| FIRST CAM SIGNAL | ↑ | ↑ | → | → | ← | ← | → | → |
|---|---|---|---|---|---|---|---|---|
| SECOND CAM SIGNAL | L | H | L | H | L | H | L | H |
| CHANGE POINT | P | P | Q(Q1) | P(P2) | P | P | Q(Q2) | P(P1) |
| GUARD COUNTER | 0 | 4800 | 6900 | 2400 | 3600 | 1200 | 3300 | 6000 |
| REFERENCE COUNTER | 6000 | 3600 | 5700 | 1200 | 2400 | 0 | 2100 | 4800 |
| ANGULAR COUNTER | 6000 | 3600 | 5700 | 1200 | 2400 | 0 | 2100 | 4800 |

↑ : RISING EDGE  ↓ : TRAILING EDGE
L : LOW LEVEL    H : HIGH LEVEL

APPARATUS FOR CONTROLLING ENGINE USING CRANK SIGNAL AND CAM SIGNAL

CROSS REFERENCE TO RELATED APPLICATION

This application is based on Japanese Patent Application 2008-107854 filed on Apr. 17, 2008 and claims the benefit of priority therefrom, so that the descriptions of which are all incorporated herein by reference.

BACKGROUND OF THE INVENTION

1. Field of the Invention

The present invention relates to apparatuses for controlling, using a pair of a crank signal and a cam signal, an engine installed in, for example, a vehicle.

2. Description of the Related Art

Engine control units for vehicles use a crank signal whose signal level varies in a predetermined same direction at regular rotation angles (regular crank angles) of an engine crankshaft. Specifically, the crank signal is measured by a crankshaft sensor connected to an engine control unit, and the measured crank signal is input, through an input path, to the engine control unit operating in a main control mode.

Specifically, the engine control unit works to identify a rotational position (crank position) of the crankshaft based on the crank signal in the main control mode.

Each time it is determined that the identified rotational position of the crankshaft is matched with a desired rotational position, the engine control unit works to generate events associated with engine control, such as fuel injection or ignition in the main control mode.

In such an engine control unit using the crank signal for engine control, if the crank signal cannot be input normally to the engine control unit due to, for example, a break in wires connecting the crankshaft sensor and the engine control unit, the engine control unit cannot identify the rotational position of the crankshaft. This may cause the engine control unit not to continuously carry out proper control of the engine.

In order to address the problem, when the crank signal cannot be input normally to the engine control unit, the engine control unit is configured to operate in a sub control mode using a can signal measured by a cam sensor and inputted thereto through the input path. The cam signal has a level that varies in a predetermined same direction at regular rotation angles of an engine camshaft.

This allows the engine control unit to continuously generate events associated with engine control based on the cam signal during the sub control mode.

Specifically, when an occurrence of a failure in the crank signal is detected, the engine control unit is configured to switch its operation mode from the main control mode using the crank signal to the sub control mode using the cam signal so as to continuously carry out engine control. The engine control of the engine control unit in the sub control mode allows the vehicle to be driven in a limp-home mode, such as driven to a safe place slowly. Such an engine control unit is disclosed in US Patent Application Publication No. 20070175272 corresponding to Japanese Patent Application Publication No. 2007-205242.

Such an engine control unit monitors the variation pattern of the level of the crank signal inputted through the input path, and determines that the crank signal is abnormally inputted thereto when:

the variation pattern of the level of the crank signal is different from a proper variation pattern of the level of the crank signal, and the level of the difference exceeds an allowable level.

After the abnormality detection and the switching from the crank signal to the cam signal, the engine control unit cannot properly detect that a failure occurs in the crank signal. This is because the variation pattern of the cam signal is different from that of the crank signal.

Note that, after a failure has occurred in the crank signal, the engine control unit needs to drive the vehicle in the limp-home mode. Therefore, after the occurrence of an abnormality in the crank signal, the engine control unit is normally configured to switch a signal to be inputted through the input path from the crank signal to the cam signal, and simultaneously stop monitoring a signal inputted through the input path.

However, after a short-term abnormality has occurred in the crank signal, when the crank signal can get back to normal, the engine control unit cannot monitor the variation pattern of the level of the crank signal because the cam signal is inputted through the input path to the engine control unit. Thus, it is desired for the engine control unit to monitor whether an abnormality, occurs in the crank signal after the cam signal has been switched to be inputted to the engine control unit through the input path from the crank signal.

This is because, if the crank signal got back to a normal so that a signal to be inputted to the engine control unit were switched again from the cam signal to the crank signal, it would be possible for the engine control unit to return its operation mode from the sub control mode to the main control mode.

SUMMARY OF THE INVENTION

In view of the background, an object of at least one aspect of the present invention is to provide techniques to continuously monitor whether an abnormality occurs in a crank signal even if a signal to be inputted to an input path for an apparatus for controlling an engine is changed from the crank signal to a cam signal.

According to an aspect of the present invention, there is provided an apparatus for controlling an engine having a crankshaft and a camshaft. The apparatus includes an input unit configured to input a crank signal as an input signal to an input path. The crank signal has a level that repetitively changes in a predetermined direction each time the crankshaft rotates by a first unit angle. The apparatus includes a multiplication clock generating unit configured to generate a first multiplication clock including a train of clock pulses whose clock cycle is determined by dividing, by a first multiplication number, the input signal. The apparatus includes a count unit configured to count in synchronization with the first multiplication clock generated by the multiplication clock generating unit) a count value of the count unit corresponding to a rotational position of the crankshaft. The apparatus includes an event generating unit configured to generate at least one event associated with control of the engine according to a crankshaft's rotational position identified by the count value of the count unit. The apparatus includes a monitoring unit configured to monitor a level change of the input signal inputted through the input path. The apparatus includes an abnormality determining unit configured to determine whether the crank signal is abnormal by comparing the monitored level change of the input signal with a normal level change of the input signal. The apparatus includes an input switching unit configured to switch the input signal to be inputted to the input path from the crank signal to a cam signal when it is determined that the crank signal is abnormal. The cam signal has a level that repetitively changes in a predetermined direction each time the camshaft rotates by a second unit angle. The apparatus includes an event signal generating unit configured to generate a crank-input event signal while it is determined that the crank signal is abnormal by the abnormality determining unit. The crank-input event signal has a level that repetitively changes in a predetermined direction. Each level change of the crank-input event signal is synchronized with a corresponding level change of the crank signal. The monitoring unit is configured to monitor a level change of the crank-input event signal while it is determined that the crank signal is abnormal by the abnormality determining unit.

BRIEF DESCRIPTION OF THE DRAWINGS

Other objects and aspects of the invention will become apparent from the following description of embodiments with reference to the accompanying drawings in which:

FIG. 6 is a time chart schematically illustrating variations of parameters of the angle clock generating unit with variation of the input signal according to the embodiment of the invention;

FIG. 7 is a flowchart schematically illustrating an input switching task to be executed by the CPU illustrated in FIG. 1;

FIG. 15 is a table schematically illustrating correspondences between individual initial values of respective counters of angle clock module illustrated in FIG. 3 and individual active edges in the cam-edge signal in a table format according to the embodiment;

DETAILED DESCRIPTION OF AN EMBODIMENT OF THE INVENTION

An embodiment of the present invention will be described hereinafter with reference to the accompanying drawings. In the embodiment, the invention is applied to an electronic control unit (ECU) 1, and the ECU 1 serves as an apparatus for controlling a four-cycle internal combustion engine E installed in a vehicle and having, for example, the first (#1) to sixth (#6) cylinders.

Figure 1:
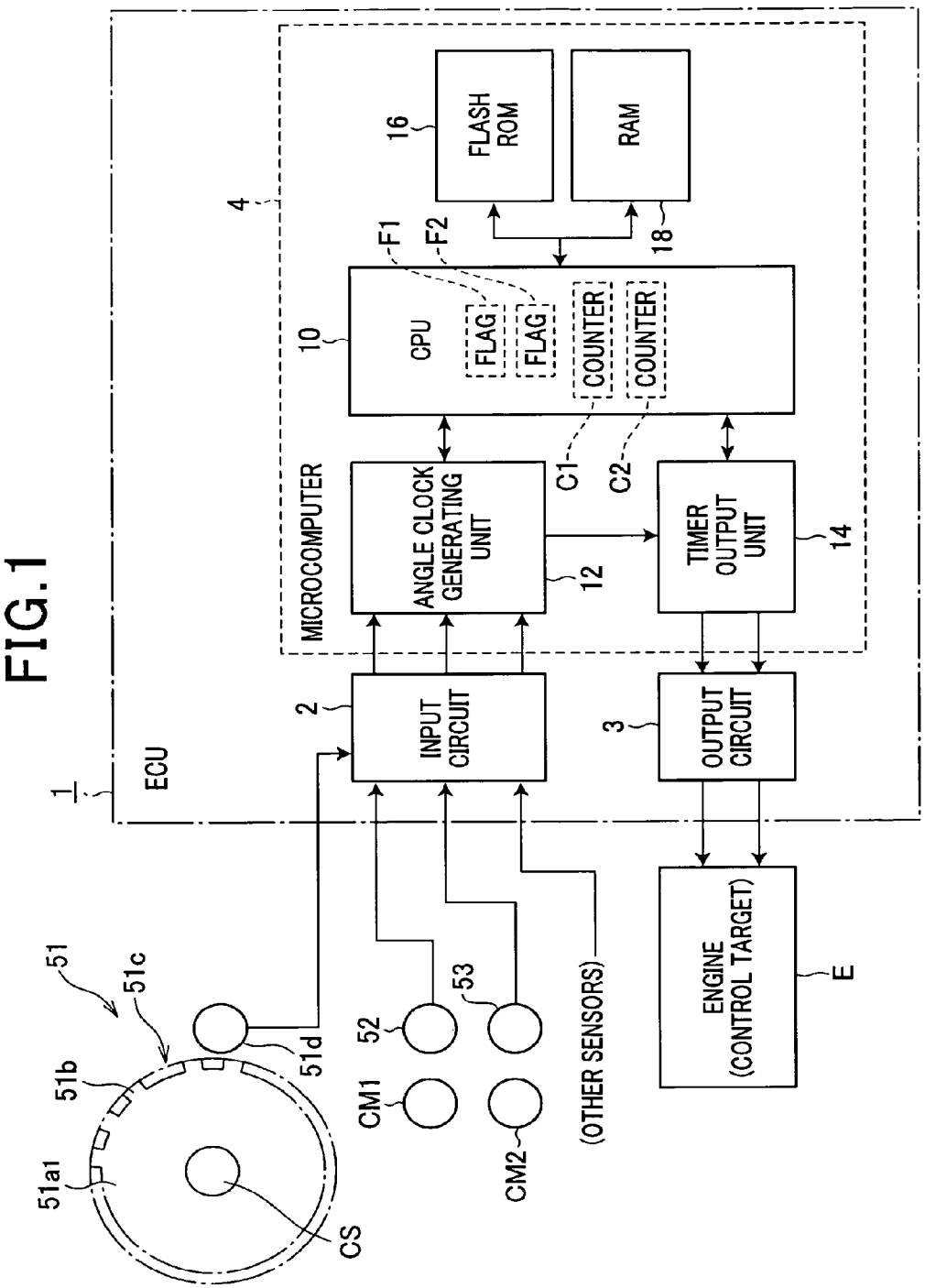
FIG. 1 is a block diagram schematically illustrating an example of the structure of an electronic control unit installed in a vehicle according to an embodiment of the present invention.

FIG. 1 is a block diagram schematically illustrating an example of the structure of the ECU 1, which is installed in advance in the vehicle according to the embodiment of the present invention.

Referring to FIG. 1, the ECU 1 according to the embodiment is provided with an input circuit 2, an output circuit 3, and a microcomputer 4. The input and output circuits 2 and 3 are electrically connected to the microcomputer 4.

The input circuit 2 is electrically connected to a crankshaft sensor 51, a fist camshaft sensor 52, a second camshaft sensor 53, and other sensors.

As illustrated in FIG. 1, the crankshaft sensor 51 for example includes a reflector disc 51a having a plurality of teeth 51b substantially spaced at angle intervals of, for example, 6 degrees around the periphery of the disc 51a. The reluctor disc 51a is coaxially mounted on a crankshaft CS serving as the engine's main shaft for delivering rotary motion taken from the reciprocating pistons and rods of the cylinders.

The reluctor disc 51a has, for example, a tooth-missing portion 51c composed of, for example, k adjacent teeth missing.

The crankshaft sensor 51 for example includes a pickup 51d operative to, for example, magnetically detect the teeth 51b of the reluctor disc 51a on the crankshaft CS as it rotates to generate a crank signal based on the detected result. The crank signal is input to the input circuit 2.

In the embodiment, when the rotational position of the crankshaft CS reaches within a given rotational region so that the tooth-missing portion 51c is located in front of the pickup bid to be detectable thereby, the rotational region of the crankshaft CS will be referred to as "specified region" hereinafter.

Because the tooth-missing portion 51c appears once every rotation angle (crank angle) of the crankshaft CS of 360 degrees (360° CA), the crankshaft CS reaches the specified region every crank angle of 360 degrees. In other words, the crankshaft CS reaches the specified region twice per one engine cycle (the crank angle of 720 degrees).

The first camshaft sensor 52 is operative to, for example, magnetically detect rotational positions of a first camshaft CM1 as it rotates, for example, at one-half rotational speed of the crankshaft CS to generate a first cam signal based on the detected result. The first cam signal is input to the input circuit 2.

Similarly, the second camshaft sensor 53 is operative to, for example, magnetically detect rotational positions of a second camshaft CM2 as it rotates, for example, at one-half rotational speed of the crankshaft CS to generate a second cam signal based on the detected result. The second cam signal is input to the input circuit 2.

Specifically, the first and second camshafts CM1 and CM2 are configured to be driven by gears, belts, and/or a chain from the crankshaft CS, and contain a series of cams for opening and closing the intake and exhaust valves, respectively.

The crank signal is configured to have a level repetitively varying in time like pulses with rotation of the crankshaft CS. Similarly, the first cam signal is configured to have a level repetitively varying in time like pulses with rotation of the first camshaft CM1, and the second cam signal is configured to have a level repetitively varying in time like pulses with rotation of the second camshaft CM2.

Next, the configurations of the crank signal and the first and second cam signals will be described in detail hereinafter with reference to FIG. 2.

Figure 2:
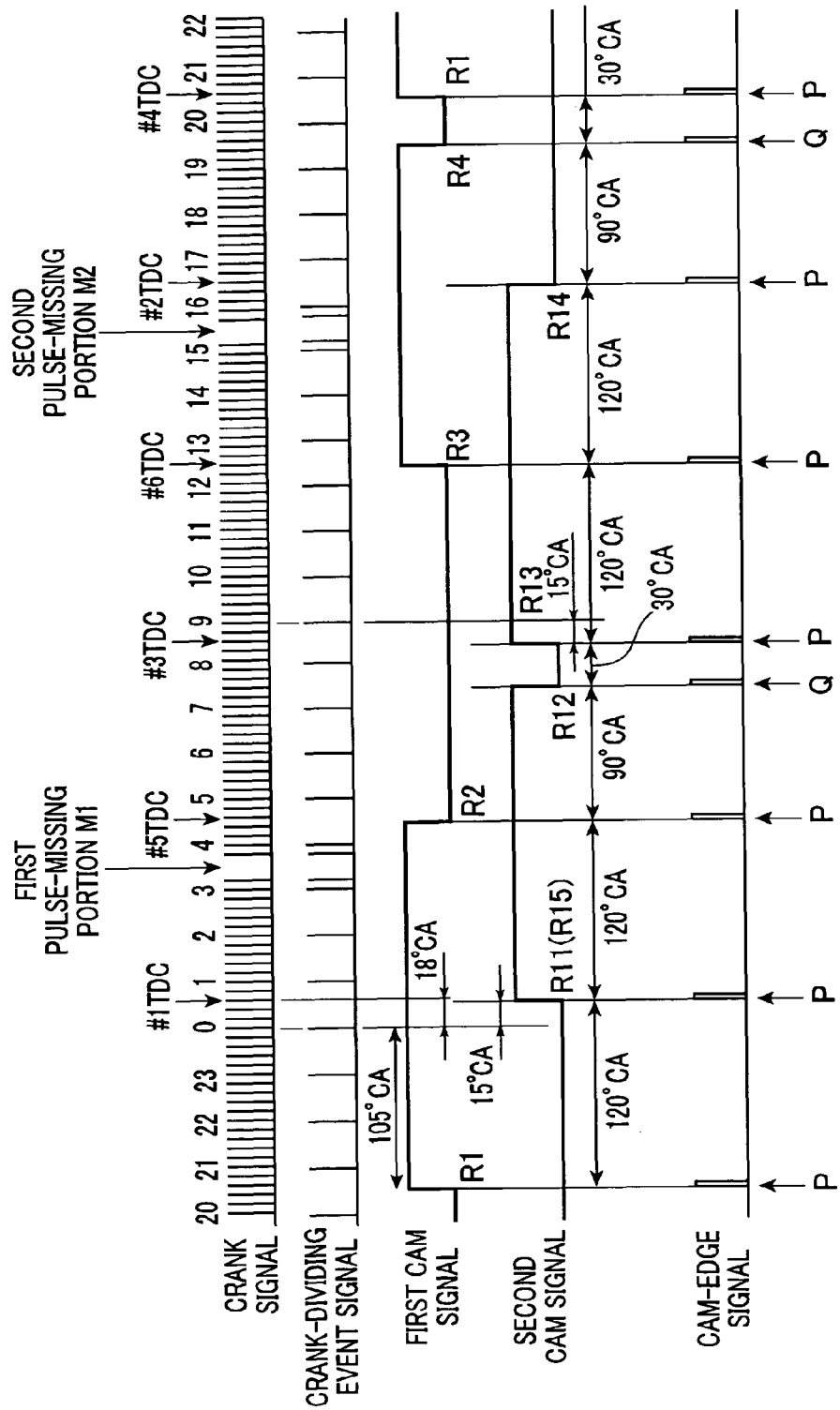
FIG. 2 is a signal waveform chart schematically illustrating a crank signal, first and second ca signals, and a cam-edge signal according to the embodiment of the present invention.

As illustrated in FIG. 2, the level of the crank signal changes in a predetermined same direction in a pulse every time the crank shaft CS (the reluctor disc 51a) rotates at a unit angle Δθ degrees crank angle (CA) while the rotational position of the crankshaft CS is not located within the specified region. In the embodiment, for example, the predetermined same direction is set to a high-to-low direction, and the unit angle Δθ degrees crank angle is set to 6 degrees crank angle.

On the other hand, while the rotational position of the crankshaft CS is located within the specified region, a rotational angle of the crankshaft CS that allows the level of the crank signal to change in the same direction (high-to-low direction) in a pulse is k-times greater than the unit angle Δθ. In the embodiment, k is set to 3.

In other words, while the rotational position of the crankshaft CS is located within a region except for the specified region, a same-directed active edge, such as a trailing edge, of the transient level change of the crank signal in a pulse appears every time the crankshaft CS rotates at the unit angle Δθ.

On the other hand, while the rotational position of the crankshaft CS is located within the specified region, same-directed k−1 active edges of the transient level change of the crank signal do not appear even though the crankshaft CS continuously rotates every unit angle Δθ.

Note that same-directed active edges, such as trailing edges or rising edges, appearing in a signal whose level transiently repetitively changes in time like a pulse signal will be referred to merely as "active edges" hereinafter.

This allows a time interval between temporally adjacent active edges of the crank signal while the rotational position of the crankshaft CS is located within the specified region to be k-times greater than a normal time interval. The normal time interval is an interval between temporally adjacent active edges of the crank signal while the rotational position of the crankshaft CS is located within a region except for the is specified region.

It is to be noted that a portion of the crank signal corresponding to the specified region, in other words, the k-times time interval between temporally adjacent active edges of the crank signal as compared with the normal time interval will be referred to as a pulse-missing portion M hereinafter.

Because the tooth-missing portion 51c appears once every the rotation angle (crank angle) of the crankshaft CS of 360 degrees (360° CA), the pulse-missing portion M also appears, in the crank signal, once every crank angle of 360 degrees.

In the crank signal according to the embodiment, an active edge appearing every time the crankshaft CS rotates at a predetermined crank angle of, for example, 120 degrees CA corresponds to TDC (Top Dead Center) of each of the individual cylinders #1, #5, #3, #6, #2, and #4 in this order in FIG. 2. The predetermined crank angle of 120 degrees can be set by dividing the crank angle of 720 degrees corresponding to one engine cycle by the number of cylinders, such as 6.

A reference position of the crank signal is set to correspond to an active edge a predetermined crank angle of, for example 18 degrees, before the active edge corresponding to the TDC of the first cylinder #1. The reference position of the crank signal is illustrated by "0" in FIG. 2.

As described above, the pulse-missing portion M appears, in the crank signal, once every crank angle of 360 degrees. In other words, the pulse-missing portions M are divided into first pulse-missing portions M1 and second pulse-missing portions M2.

In the crank signal, the first pulse-missing portion M1 starts from a first active edge the crank angle of 108 degrees after the active edge appearing at the reference position every engine cycle. The second pulse-missing portion M2 starts from a second active edge the crank angle of 360 degrees after the first active edge every engine cycle.

Specifically, the k-times time interval as compared with the normal time interval after the first active edge corresponds to the first pulse-missing portion M1, and the k-times time interval as compared with the normal time interval after the second active edge corresponds to the second pulse-missing portion M2.

Next, the first cam signal is configured to:

vary from a low level to a high level when the first camshaft CM1 is located at a first rotational position R1 the crank angle of 105 degrees before the reference position;

hold the high level during a first period corresponding to the crank angle of 240 degrees from the high-level turning timing;

vary from the high level to the low level at a second rotational position R2 immediately after the elapse of the first period;

hold the low level during a second period corresponding to the crank angle of 240 degrees from the low-level turning timing;

vary from the low level to the high level at a third rotational position R3 immediately after the elapse of the second period;

hold the high level during a third period corresponding to the crank angle of 210 degrees from the high-level turning timing;

vary from the high level to the low level at a fourth rotational position R4 immediately after the elapse of the third period;

hold the low level during a fourth period corresponding to the crank angle of 30 degrees from the low-level turning timing so as to return the first rotational position R1, thereby repeating the series of variations every engine cycle (crank angle of 720 degrees).

The second cam signal is configured to:

vary from a low level to a high level when the second camshaft CM2 is located at a first rotational position R11 the crank angle of 15 degrees after the reference position;

hold the high level during a first period corresponding to the crank angle of 210 degrees from the high-level turning timing;

vary from the high level to the low level at a second rotational position R12 immediately after the elapse of the first period;

hold the low level during a second period corresponding to the crank angle of 30 degrees from the low-level turning timing;

vary from the low level to the high level at a third rotational position R13 immediately after the elapse of the second period;

hold the high level during a third period corresponding to the crank angle of 240 degrees from the high-level turning timing;

vary from the high level to the low level at a fourth rotational position R14 immediately after the elapse of the third period;

hold the low level during a fourth period corresponding to the crank angle of 240 degrees from the low-level turning timing so as to return the first rotational position R11, thereby repeating the series of variations every engine cycle (crank angle of 720 degrees).

The other sensors are installed beforehand in the vehicle and arranged to measure various types of physical quantities. These physical quantities are required for the ECU 1 to control the individual control targets. Measurement signals indicative of measurands output from the other sensors are periodically input to the input circuit 2.

The input circuit 2 serves as a waveform shaping circuit. Specifically, the input circuit 2 is operative to apply waveform shaping to the crank signal, the first and second cam signals, and the measurement signals respectively output from the crankshaft sensor 51, the first and second cam sensors 52 and 53, and the other sensors. In addition, the input circuit 2 is operative to output the waveform-shaped signals to the microcomputer 4.

The output circuit 3 is operative to output, to control targets associated with engine control, such as injectors and/or igniters for the respective cylinders, activation signals described hereinafter, based on target-control instructions sent from the microcomputer 4.

The microcomputer 4 consists essentially of a CPU 10, an angle clock generating unit 12, a timer output unit 14, a flash ROM 16, and a RAM 18; these units 12, 14, 16, and 18 are electrically connected to the CPU 10.

The CPU 10 is operative to control the entire microcomputer 4.

The angle clock generating unit 12 is operative to receive the crank signal and the first and second can signals output from the input circuit 2.

The timer output unit 14 for example incorporates first and second timers and is operative to output, to the output circuit 3, the target-control instructions based on count values of the first and second timers for each of the individual control targets; these target-control instructions determine a standby period and an active period for each of the individual control targets.

The flash ROM 16 is used as an example of various types of nonvolatile memories. Specifically, the flash ROM 16 has stored therein a plurality of programs. At least one of the programs causes the CPU 10 to execute various tasks including: (1) an input signal diagnosing task, (2) an input-signal switching task, (3) an input dividing task, (4) crank-edge interrupt task, (5) cam-edge interrupt task, and (6) pass-angle interrupt task, which will be described hereinafter.

The RAM 18 is operative to be quickly accessible by the CPU 10 and to store therein data processed by the CPU 10.

Figure 3:
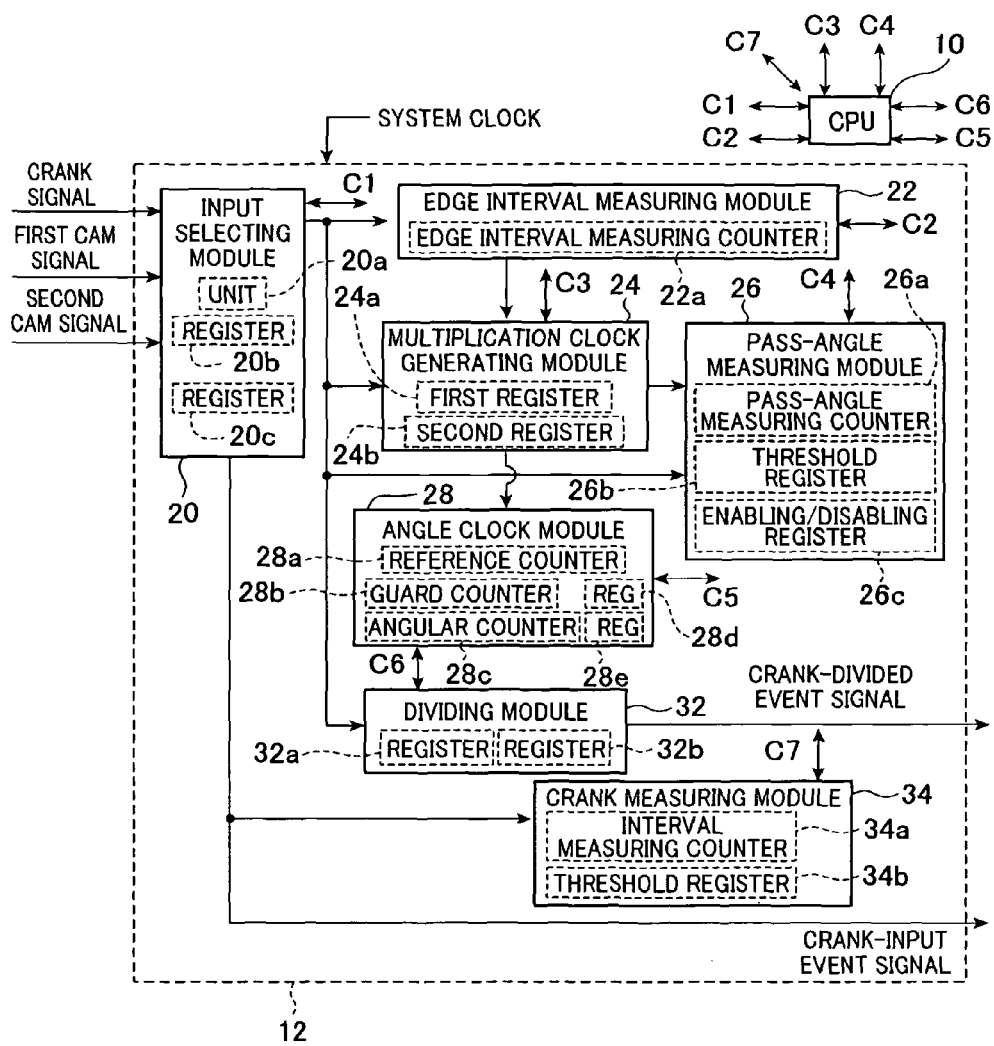
FIG. 3 is a block diagram schematically illustrating an example of the structure of an angle clock generating unit illustrated in FIG. 1.

As illustrated in FIG. 3, the angle clock generating unit 12 includes an input selecting module 20, an edge interval measuring module 22, a multiplication clock generating module 24, a pass-angle interrupt module 26, an angle clock module 28, an input dividing module (dividing module) 32, and a crank measuring module 34. Each of the modules 20, 22, 24, 26, 28, 32, and 34 is operatively connected to the CPU 10.

The input selecting module 20 is operatively connected, through an input path, to the edge interval measuring module 22, the multiplication clock generating module 24, the pass-angle interrupt module 26, the angle clock module 28, the input dividing module 32, and the crank measuring module 34.

The input selecting module 20 incorporates a unit 20a configured to receive the crank signal and the first and second cam signals sent from the input circuit 2, and to select one of the received crank signal and a signal; this signal is generated by the unit 20a based on the received first and second cam signals. The unit 20a of the input selecting module 20 is configured to output the selected one of the crank signal and the generated signal to each of the modules 22, 24, 26, 28, 32, and 34 via the input path.

Specifically, the signal generated by the unit 20a using the first and second cam signals is configured to have a level transiently vary in time in a predetermined same direction, such as a low-to-high direction, each time a level-variation appears in the individual first and second cam signals. In other words, in the signal generated by the unit 20a, a same-directed active edge, such as a rising edge, appears each time a level-inversion appears in the individual first and second cam signals. The signal generated by the unit 20a described above will be referred to as "cam-edge signal" hereinafter. Same-directed active edges of the cam-edge signal will be referred to merely as "active edges" hereinafter.

Specifically, as illustrated in FIG. 2, the level of the cam-edge signal is configured to transiently change in time in the low-to-high direction at individual change points P and Q corresponding to the individual level-variation timings of the first and second cam signals.

In the embodiment, the cam-edge signal regularly changes in level at the change points P whose angular interval corresponds to the crank angle of 120 degrees crank angle except for the change points Q whose angular interval corresponds to the crank angle of 360 degrees.

For example, the input selecting module 20 can be designed to logically OR the first and second cam signals to generate the cam-edge signal.

The input selecting module 20 also incorporates a register 20b that can store at least one bit of data rewritable by the CPU 10. In the embodiment, the at least one bit of data indicative of "1" is stored beforehand in the register 20b as a default.

The data "1" stored in the register 20b enables the input selecting module 20 to selectively pass, as an input signal, any one of the crank signal and the cam-edge signal to at least one of the modules 22, 24, 26, 28, 32, and 34.

In contrast, when the at least one bit of data is rewritten into "0" by the CPU 10, the data "0" prevents the input selecting module 20 from passing the crank signal and the cam-edge signal to the modules 22, 24, 26, 28, 32, and 34.

The input selecting module 20 further incorporates a register 20c that can store at least one bit of data rewritable by the CPU 10. In the embodiment, the at least one bit of data indicative of "0" is stored beforehand in the register 20c as a default.

The data "0" stored in the register 20c prevents the input selecting module 20 from sending a crank-input event signal to at least one eternal element, such as the CPU 10.

In contrast, when the at least one bit of data is rewritten into "1" by the CPU 10, the data "1" enables the input selecting module 20 to send the crank-input event signal to the at least one external element, such as the CPU 10.

Note that the crank-input event signal means the crank signal itself, or a signal whose level transiently varies in time in a predetermined same direction, such as a low-to-high direction, each time a level-variation appears in the crank signal in the same direction.

The edge interval measuring module 22 is operatively connected to the multiplication clock generating module 24 and contains an edge interval measuring counter 22a.

Each time an active edge currently appears in the input signal passed from the input selecting module 20 to the edge interval measuring module 22, the edge interval measuring counter 22a works to measure a time interval between the current active edge and the next active edge temporally adjacent thereto appearing in the input signal.

Specifically, each time an active edge currently appears in the input signal, the edge interval measuring counter 22a works to:

reset its count value; and immediately after the reset, count up the number of active edges (trailing edges or rising edges) of clock pulses of a system clock generated by the microcomputer 4 until the next temporally adjacent active edge appears in the input signal.

Figure 4:
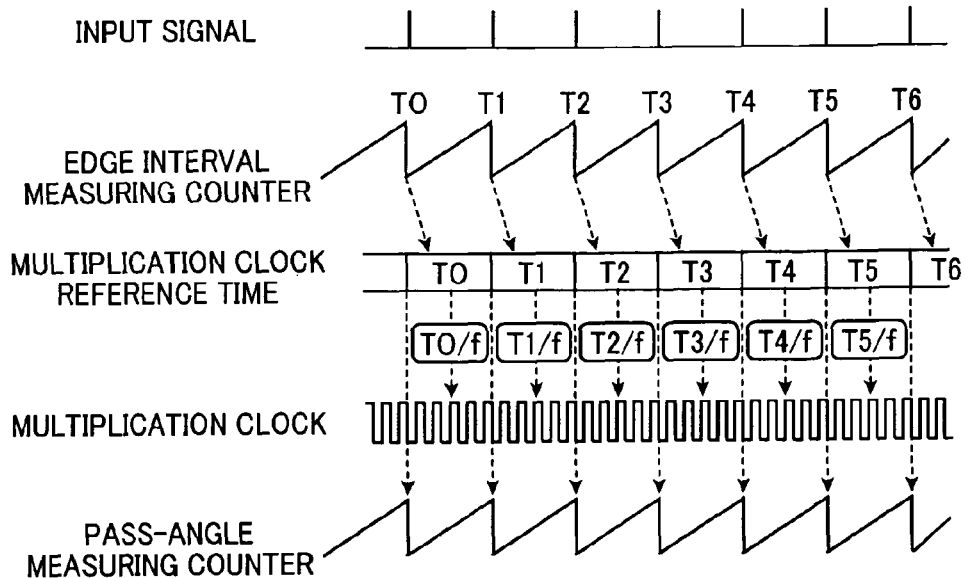
FIG. 4 is a time chart schematically illustrating variations of parameters of the angle clock generating unit with variation of an input signal according to the embodiment of the invention.

It is to be noted that the system clock allows synchronization of the tasks in the microcomputer 4 with each other. As described above) the system clock consists of a repetitive series of the clock pulses with a constant clock cycle and a constant clock frequency; this clock frequency is higher than a frequency of active edges in the input signal. The variation of the count value of the edge interval measuring counter 22a is schematically illustrated in FIG. 4.

As a result, individual intervals between temporally adjacent current and next active edges in the input signal passed from the input selecting, module 20 to the edge interval measuring module 22 are sequentially measured as corresponding individual count values of the edge interval measuring counter 22a of the edge interval measuring module 22.

The edge interval measuring module 22 is also operative to pass a count value (measured interval) of the edge interval measuring counter 22a to the multiplication clock generating module 24 each time a next active edge currently appears in the input signal before reset of the count value.

The multiplication clock generating module 24 is operatively connected to the pass-angle measuring module 26 and the angle clock module 28 and contains first and second registers 24a and 24b. The second register 24b is operative to store therein a multiplication number f. In the embodiment, a default of the multiplication number f is set to 60 for the crank signal, and the multiplication number f for the crank signal whose default is "60" will be specifically expressed by "f1" hereinafter.

Each time a count value of the edge interval measuring counter 22a is passed to the multiplication clock generating module 24, the multiplication clock generating module 24 works to:

receive the count value (measured interval);

store the received count value in the first register 24a as a multiplication-clock reference time (see "multiplication-clock reference time" in FIG. 4);

divide the multiplication-clock reference time stored in the first register 24a by the multiplication number f stored in the second register 24b to generate a multiplication clock consisting of a repetitive series of multiplication clock pulses whose clock cycle is a multiplication-number submultiple of the multiplication-clock reference time (see "multiplication clock" in FIG. 4); and output the generated multiplication clock to the pass-angle measuring module 26 and the angle clock module 28.

Because the multiplication-clock reference time depends on the count value of the edge interval measuring counter 22a depending on a corresponding interval of temporally adjacent active edges in the input signal, the clock cycle of the multiplication clock depends on change of the multiplication-clock reference time.

For example, as illustrated in FIG. 4, when a count value T0 is stored in the first register 24a as the multiplication-clock reference time, the cycle of the multiplication clock is set to T0/f. When the count value T0 stored in the first register 24a is updated to a count value T1, the cycle of the multiplication clock signal is changed from T0/f to T1/f.

Similarly, when the count value T1 stored in the first register 24a is updated to a count value T2, the cycle of the multiplication clock signal is changed from T1/f to T2/f. The same applies to when count values stored in the first register 24a are updated to T3 to T5.

The pass-angle measuring module 26 incorporates a pass-angle measuring counter 26a for counting up the number of variations in the multiplication clock in a predetermined same direction, such as a low-to-high direction in the embodiment.

Specifically, the pass-angle measuring counter 26a works to:

receive the multiplication clock output from the multiplication clock generating module 24;

reset its count value each time an active edge of the input signal is input thereto via the input selecting module 20; and count up the number of rising edges of the multiplication clock pulses of the received multiplication clock until the next temporally adjacent active edge of the input signal is input to the pass-angle measuring counter 26a (see "pass-angle measuring counter" in FIG. 4).

As described above, the input signal to be input from the input selecting module 20 to the pass-angle interrupt module 26 is any one of the crank signal, the cam-edge signal, and the crank-input event signal.

The crank signal or the crank-input event signal is configured to have a level transiently varying repetitively in time with rotation of the crankshaft CS, and the ca-edge signal is configured to have a level transiently varying repetitively in time in a predetermined same direction, such as a low-to-high direction, with rotation of any one of the first and second camshafts CM1 and CM2.

Thus, the multiplication clock has a clock cycle that is an integral submultiple of a corresponding time interval between temporally adjacent active edges in the input signal (any one of the crank signal, the cam-edge signal, and the crank-input event signal).

Accordingly, the pass-angle measuring counter 26a is operative to measure a rotational angle of the crankshaft CS between each pair of temporally adjacent active edges in the input signal with a high resolution as compared with that as in the case of measuring the rotational angle in synchronization with an active edge of the input signal.

In other words, the pass-angle measuring counter 26a is operative to measure a rotational angle of the crankshaft CS passing from 0 degrees crank angle to $\Delta\theta$ degrees crank angle between each pair of temporally adjacent active edges in the input signal with a resolution f-times greater than that as in the case of measuring the rotational angle in synchronization with an active edge of the input signal.

It is to be noted that a measured value (count value) of the pass-angle measuring counter 26a depends on a corresponding time interval between temporally adjacent active edges in the input signal.

In addition, the pass-angle measuring module 26 includes a threshold register 26b for storing a threshold value for the count value of the pass-angle measuring counter 26a. The pass-angle measuring module 26 is operative to generate an interrupt when the count value of the pass-angle measuring counter 26a is equal to or greater than the threshold value stored in the threshold register 26b, thereby outputting the interrupt to the CPU 10.

In the embodiment, a default of the threshold value stored in the threshold register 26b is set to a predetermined value greater than a reference count value that the pass-angle measuring counter 26a can reach while no pulse-missing portions M appear in the crank signal; this reference count value corresponds to $\Delta\theta$ degrees crank angle of the crankshaft CS.

In addition, the default of the threshold value stored in the threshold register 26b is smaller than the specified count value that the counter 26a can reach while one of the pulse-missing portions M appears in the crank signal.

For example, as the default of the threshold value, a value 2.5 times as great as the reference count value $\Delta\theta$ is stored in the threshold register 26b; this default of the threshold is given by $2.5 \times \Delta\theta$.

The pass-angle measuring module 26 also includes an enabling/disabling register 26c for storing information indicative of "enabling" or "disabling" under control of the CPU 10. As a default of the information, the information indicative of "disabling" is stored beforehand in the enabling/disabling register 26c.

The angle clock module 28 includes a reference counter 28a, a guard counter 28b, and an angular counter 28c.

The reference counter 28a is operative to count up the number of variations in the multiplication clock in the predetermined same direction, such as the low-to-high direction, in the embodiment.

The guard counter 28b is operative to count up by the multiplication number f each time the level of the input signal input thereto from the input selecting module 20 varies in the predetermined direction, such as the low-to-high direction.

The angular counter 28c is operative to cause its count value to automatically follow the count value of the reference counter 28a in synchronization with an active edge, for example, rising edge of each clock pulse of the system clock.

The angle clock module 28 also includes first and second registers (REG) 28d and 28e. The first register 28d is operative to store therein an upper limit for the reference counter 28a and the angular counter 28c. The second register 28e is operative to store therein a mode value. The mode value determines the operation mode of the reference counter 28a.

The reference counter 28a is configured to:
count up the number of rising edges of the multiplication clock input thereto from the multiplication clock generating module 24 and
reset its count value to zero (0) in response to the rising edge that appears in the multiplication clock after the count value reaches the upper limit stored in the first register 28d.

The reference counter 28a is also configured to execute the counting operation in one of the operation modes; this one of the operation modes is determined by the mode value stored in the second register 28e.

In the embodiment, the operation modes include:
disabling mode in which the reference counter 28a disables the counting-up after the count value reaches the count value of the guard counter 28b; and
enabling mode in which the reference counter 28a enables the counting-up even after the count value reaches the count value of the guard counter 28b.

In the embodiment, the angular counter 28c is configured such that a count value thereof corresponds to a rotational position of the crankshaft CS when the rotational position is represented with the resolution; this resolution is obtained by dividing the unit angle $\Delta\theta$ degrees crank angle, such as 6 degrees crank angle, by the 60 of the multiplication number f1; this resolution is determined to be "6°/60=0.1° angle".

The input dividing module 32 includes registers 32a and 32b. The register 32a is operative to store therein a dividing ratio n, and the register 32b is operative to store therein a flag "1" or "0". A default value of the dividing ratio n is set to 5, and the flag of "1" is set to the register 32b as a default value.

The input dividing module 32 works to divide the input signal inputted from the input selecting module 20 by the dividing ratio n to thereby generate a crank-divided event signal. The input dividing module 32 also works to send, to at least one external element, such as the CPU 10, the crank-divided event signal.

Referring to FIG. 2, the level of the crank-divided event signal is configured to transiently change in time in the low-to-high direction each time the number n of the active edges in the crank signal appear. In other words, an active edge in the crank-divided event signal appears each time the crank shaft CA rotates by a predetermined crank angle; this predetermined crank angle is represented by the product of the dividing ratio n and the unit angle $\Delta\theta$ degrees crank angle. For example, when the dividing ratio n is set to the default value of 5, an active edge in the crank-divided event signal appears each time the crank shaft CA rotates by "6° CA×5=30° CA.

The flag set to the register 32b determines whether the input dividing module 32 outputs the crank-divided event signal to the at least one external element.

Specifically, e flag of "1" enables the input dividing module 32 to output the crank-divided event signal to the at least one external element, but the flag of "0" disables the input dividing module 32 to output the crank-divided event signal to the at least one external element.

The crank measuring module 34 includes an interval measuring counter 34a.

Each time an active edge (a same-directed active edge from low-to-high direction) currently appears in the crank-input event signal passed from the input selecting module 20 to the crank measuring module 34, the interval measuring counter 34a works to measure a time interval between the current active edge and the next active edge temporally adjacent thereto appearing in the crank-input event signal.

Specifically, each time an active edge currently appears in the crank-input event signal, the interval measuring counter 34a works to:
reset its count value; and
immediately after the reset, count up the number of active edges (trailing edges or rising edges) of clock pulses of the system clock generated by the microcomputer 4 until the next temporally adjacent active edge appears in the crank-input event signal.

It is to be noted that a measured value (count value) of the crank measuring module 34 depends on a corresponding time interval between temporally adjacent active edges in the crank-input event signal.

In addition, the crank measuring module 34 includes a threshold register 34b for storing therein a threshold value for the count value of the interval measuring counter 34a. The crank measuring module 34 is operative to generate an interrupt when the count value of the interval measuring counter 34a is equal to or greater than the threshold value stored in the threshold register 34b, thereby outputting the interrupt to the CPU 10.

In the embodiment, a default of the threshold value is set to a predetermined value stored in the threshold register 34b is greater than a reference count value that the interval measuring counter 34a can reach while no pulse-missing portions M appear in the crank signal.

In addition, the default of the threshold value stored in the threshold register 34b is smaller than the specified count value that the counter 26a can reach while one of the pulse-missing portions M appears in the crank signal.

For example, as the default of the threshold value, a value 2.5 times as great as the reference count value is stored in the threshold register 34b.

Next, various tasks to be executed by the CPU 10 of the microcomputer 4 in accordance with at least one of the programs stored in, for example, the flash ROM 16 will be described hereinafter with reference to FIGS. 5 to 19.

(1) Input Signal Diagnosing Task

First, the input signal diagnosing task to be executed by the CPU 10 will be described hereinafter with reference to FIG. 5. The input signal diagnosing task is carried out each time an active edge appears in either the crank-divided event signal outputted from the input dividing module 32 or the crank-input event signal outputted from the input selecting module 20 after the microcomputer 4 has been booted.

In other words, the input signal diagnosing task is carried out each time the level of either crank-divided event signal or the crank-input event signal is changed in a predetermined same direction, such as a low-to-high direction, after the microcomputer 4 has been booted. Either the crank-divided event signal or the crank-input event signal that triggers the start of the input signal diagnosing task will be referred to as "trigger signal" hereinafter.

Note that the crank-divided event signal and the crank-input event signal are designed not to be simultaneously outputted described hereinafter, and therefore, the input signal diagnosing task is launched each time a specified directed level change (low-to-high level change) appears in any one of the crank-divided event signal and the crank-input event signal that is outputted.

Figure 5:
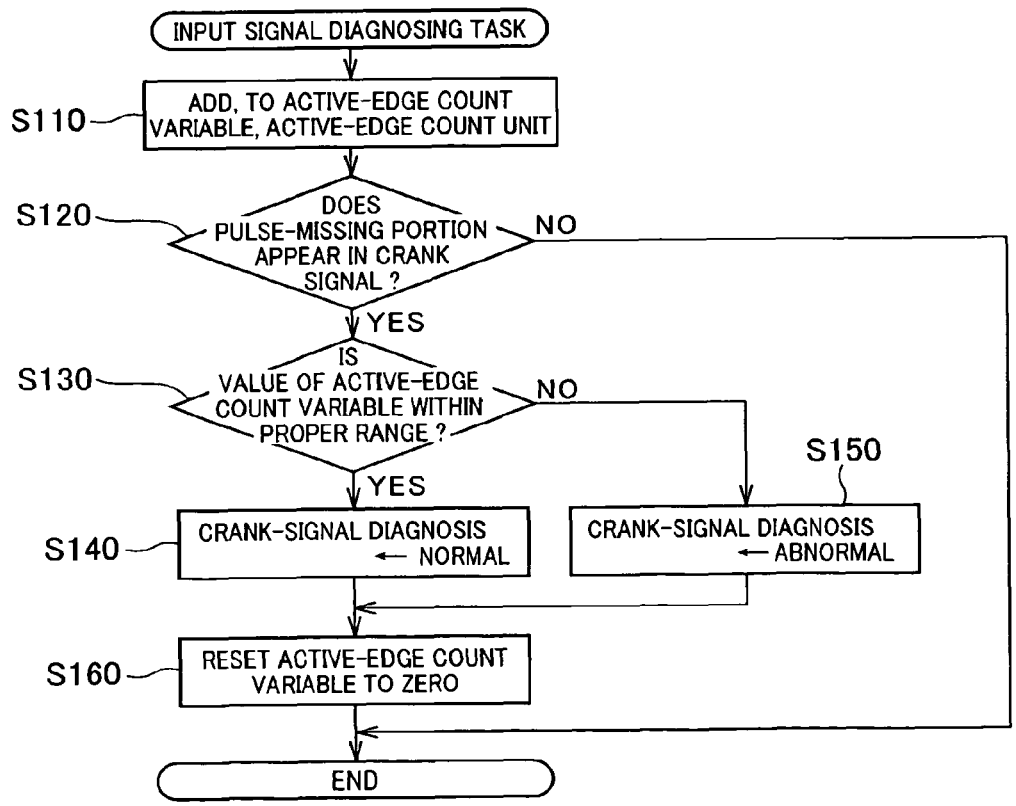
FIG. 5 is a flowchart schematically illustrating an input signal diagnosing task to be executed by a CPU illustrated in FIG. 1.

When launching the input signal diagnosing task, the CPU 10 adds, to a value of a prepared "active-edge count variable", the number of specified-level changes (unit active-edges) in the crank signal required for an active edge to appear in the trigger signal in step S110 of FIG. 5. The active-edge count variable represents count of specified-level changes (active edges) in the crank signal between one of the pulse-missing portions and the next one of the pulse-missing portions. A default value of the active-edge count variable is set to zero. The number of specified-level changes (active edges) in the crank signal required for an active edge to appear in the trigger signal will also be referred to as "active-edge count unit" hereinafter (see FIG. 5).

For example, when the crank-divided event signal is outputted from the input selecting module 20 as the trigger signal, the CPU 10 adds, to a value of the active-edge count variable, the dividing ratio n set to the register 32b of the input dividing module 32. This is because, in the crank-divided event signal, an active edge (a specified-level change) appears each time the number of n of sequential active edges (sequential specified-level changes) appears in the crank signal (see FIG. 2).

In contrast, when the crank-input event signal is outputted from the input selecting module 20 as the trigger signal, the CPU 10 add "1" to a value of the active-edge count variable. This is because, in the crank-input event signal, an active edge (a specified-level change) appears each time one active edge (one specified-level change) appears in the crank signal.

Next, the CPU 10 checks whether a pulse-missing portion appears in the crank signal in step S120. For example, in step S120, the CPU 10 determines that a pulse-missing portion appears in the crank signal according to when an interrupt is inputted thereto from the pass-angle measuring module 26.

Note that, as illustrated in FIG. 6 for example, it is assumed that temporally adjacent active edges E12 and E13 in the crank signal constitute a pulse-missing portion Ma therein.

In this assumption, the time interval of the pulse-missing portion Ma between the active edges E12 and E13 corresponds to a measured count value T12 of the edge interval measuring counter 22a. Intervals between temporally adjacent active edges of other portions except for the pulse-missing portions M in the crank signal respectively correspond to measured count values T10, T11, T13, T14, . . . .

As clearly seen in FIG. 6, the time interval of the pulse-missing portion Ma in the crank signal is longer than the intervals of the other portions except for the pulse-missing portions M therein. For is reason, the count value T12 corresponding to the time interval of the pulse-missing portion Ma in the crank signal is greater than the other count values each corresponding to one of the other portions therein.

As described above) a measured value (count value) of the pass-angle measuring counter 26a depends on a corresponding time interval between temporally adjacent same-directed edges in the crank signal. For this reason, a count value of the pass-angle measuring counter 26a corresponding to the time interval of the pulse-missing portion Ma in the crank signal is greater than that of the counter 26a corresponding to another time interval of one of the other portions in the crank signal.

In addition, the default ($\Delta\theta \times 2.5$) of the threshold value stored in the threshold register 26b is greater than the reference count value that the pass-angle measuring counter 26a can reach while no pulse-missing portions M appear in the crank signal, and smaller than the specified count value that the counter 26a can reach while one of the pulse-missing portions M appears in the crank signal.

For this reasons the count value of the pass-angle measuring counter 26a corresponding to the time interval of the pulse-missing portion Ma in the crank signal exceeds the specified count value greater than the default ($\Delta\theta \times 2.5$) of the threshold value stored in the threshold register 26b. For example, the count value of the pass-angle measuring counter 26a corresponding to the time interval of the pulse-missing portion Ma in the crank signal is illustrated by "$\Delta\theta \times 3$" in FIG. 6.

As well as the pass-angle measuring module 26, a measured value (count value) of the interval measuring counter 34a depends on a corresponding time interval between temporally adjacent same-directed edges in the crank signal. For this reason, a count value of the interval measuring counter 34a corresponding to the time interval of the pulse-missing portion Ma in the crank signal is greater than that of the counter 34a corresponding to another time interval of one of the other portions in the crank signal.

For this reason, the count value of the interval measuring counter 34a corresponding to the time interval of the pulse-missing portion Ma in the crank signal exceeds the specified count value greater than the default of the threshold value stored in the threshold register 34b.

As a result, when the count value of the pass-angle measuring counter 26a corresponding to the time interval of the pulse-missing portion Ma in the crank signal reaches the default of the threshold value, the pass-angle measuring module 26 generates an interrupt, thereby outputting it to the CPU 10. Similarly, when the count value of the interval measuring counter 34a corresponding to the time interval of the pulse-missing portion Ma in the crank signal reaches the default of the threshold value, the crank measuring module 34 generates an interrupt, thereby outputting it to the CPU 10.

Accordingly, when receiving the interrupt outputted from the pass-angle measuring module 26 or crank measuring module 34, the CPU 10 determines that a pulse-missing portion appears in the crank signal (YES in step S120).

More specifically, if the trigger signal is the crank-divided event signal, when receiving the interrupt outputted from the pass-angle measuring module 26, the CPU 10 determines that a pulse-missing portion appears in the crank signal (YES in step S120). On the other hand, if the trigger signal is the crank-input event signal, when receiving the interrupt outputted from the crank measuring module 34, the CPU 10 determines that a pulse missing portion appears in the crank signal (S in step S120). Then, the CPU 10 proceeds to step S130.

Otherwise, when receiving no interrupt from any one of the pass-angle measuring module 26 and the crank measuring module 34, the CPU 10 determines that no pulse missing portion appears in the crank signal, terminating the input signal diagnosing task.

After the negative determination in step S120, the input signal diagnosing task is launched so that a value of the active-edge count variable that is incremented by the active-edge count unit in step S110 each time a specified directed level change (low-to-high level change) appears in any one of the crank-divided event signal and the crank-input event signal. That is, this increment is repeated until a pulse-missing portion appears in the crank signal.

Thus, when it is determined that a pulse-missing portion appears in the crank signal (YES in step S120), the CPU 10 determines whether the value of the active-edge count variable is within a proper range in step S130. The proper range means an estimated range within which the number of proper specified-level changes (active edges) in the crank signal during a period between one of the pulse-missing portions and the next one of the pulse-missing portions is.

Upon determining that the value of the active-edge count variable is within the proper range (YES in step S130), the CPU 10 stores, in the RAM 18 or the flash ROM 16, information representing that the diagnosis of the crank signal is "normal" in step S140, proceeding to step S160.

Otherwise, upon determining that the value of the active-edge count variable is not within the proper range (NO in step S130), the CPU 10 stores, in the RAM 18 or the flash ROM 16, information representing that the diagnosis of the crank signal is "abnormal" in step S150, proceeding to step S160.

In step S160, the CPU 10 resets the active-edge count variable to the default value of zero, terminating the input signal diagnosing task.

(2) Input-Signal Switching Task

Next, the input-signal switching task to be executed by the CPU 10 at regular intervals in parallel with the input-signal diagnosing task after the microcomputer 4 has been booted will be described hereinafter with reference to FIG. 7.

When launching the input-switching task, the CPU 10 refers to the information indicative of the diagnosis of the crank signal stored in the flash ROM 16 or the RAM 18 by the operations in steps S140 or S150 thereby determining whether the crank signal is normal based on the referred result in step S210.

When it is determined that the crank signal is normal (the determination in step S210 is YES), the CPU 10 proceeds to step S220. In step S220, the CPU 10 sends, to the input selecting module 20, a crank-signal selection instruction to select the crank signal as the input signal. In addition, in step S220, the CPU 10 sends, to each of the modules 20, 24, 26, 28, the crank-signal selection instruction.

The crank-signal selection instruction received by the input selecting module 20 switches the input pass to select the crank signal as the input signal, thereby passing the selected crank signal as the input signal to each of the modules of the angle clock generating unit 12.

The crank-signal selection instruction received by the multiplication clock generating module 24 allows the module 24 to store, as the multiplication number f1, 60 for the crank signal in the second register 24b.

The crank-signal selection instruction received by the pass-angle measuring module 26 allows the module 26 to store in the threshold register 26b, as the threshold value, a value equivalent to the default given by $\Delta\theta \times 2.5$.

The crank-signal selection instruction received by the angle clock module 28 allows the module 28 to store, in the first register 28d, an upper limit of each of the reference counter 28a and the angular counter 28c; this upper limit is determined for the crank signal. Note that, in the embodiment, the upper limit for the crank signal is given by a value determined by dividing a 360 degrees crank angle corresponding to one, rotation of the crankshaft CS by $0.1°$ CA resolution based on the angular counter 28c. That is, the upper limit for the crank signal is determined to be "360/0.1=3600".

Next, the CPU 10 prevents the angle clock generating unit 12 from outputting the crank-input event signal in step S230.

For example, in step S230, the CPU 10 sends, to The angle clock generating module 12, an instruction to prevent the output of the crank-input event signal.

In response to receiving the instruction to prevent the output of the crank-input event signal, the angle clock generating module 12 overwrites (rewrites) the register 20b of the input selecting module 20 into "0". The data "0" prevents the input selecting module 20 from passing the crank-input event signal to the modules 22, 24, 26, 28, 32, and 34. Thereafter, the CPU 10 terminates the input-switching task.

Otherwise when it is determined that the crank signal is abnormal (the determination in step S210 is NO), the CPU 10 proceeds to step S240.

In step S240, the CPU 10 sends, to the input selecting module 20, a cam-edge signal selection instruction to select the cam-edge signal as the input signal. In addition, in step S240, the CPU 10 sends, to each of the modules of the angle clock generating module 12, the cam-edge signal selection instruction.

The cam-edge signal selection instruction received by the input selecting module 20 allows the module 20 to select the cam-edge signal as the input signal, thereby passing the selected cam-edge signal as the input signal to each of the modules of the angle clock generating module 12.

The cam-edge signal selection instruction received by the multiplication clock generating module 24 allows the module 24 to store, as the multiplication number f, a value for the cam-edge signal in the second register 24b. In the embodiment, the multiplication number f for the cam-edge signal will be specifically expressed by "f2" hereinafter.

The value as the multiplication number f2 for the cam-edge signal stored in the second register 24b is obtained by:

calculating the product of an angular interval of 120 degrees crank angle between arbitrary two temporally adjacent points P in the cam-edge signal and the multiplication number 60 for the crank signal; and dividing the obtained product by the unit angle of 6 degrees crank angle.

That is, the multiplication number f2 for the cam-edge signal is determined to be "(120×60)/6=1200".

The cam-edge signal selection instruction received by the angle clock module 28 allows the module 28 to store, in the first register 28d, an upper limit of each of the reference counter 28a and the angular counter 28c; this upper limit is determined for the cam-edge signal. Note that, in the embodiment, the upper limit for the cam-edge signal is given by a value determined by dividing 720 degrees crank angle corresponding to one rotation of the each of the first and second camshafts CM1 and CM2 by 0.1° CA resolution based on the angular counter 28c. That is, the upper limit for the cam-edge signal is determined to be "720/0.1=7200".

Note that, unlike in step S220, a threshold value is not stored in the threshold register 26b in step S240.

Next, the CPU 10 allows the angle clock generating unit 12 to output the crank-input event signal in step S250.

For example, in step S250, the CPU 10 sends, to the angle clock generating module 12, an instruction to allow the output of the crank-input event signal.

In response to receiving the instruction to allow the output of the crank-input event signal, the angle clock generating module 12 overwrites the register 20b of the input selecting module 20 into "1". The data "1" allows the input selecting module 20 from passing the crank-input event signal to the modules 22, 24, 26, 28, 32, and 34. Thereafter, the CPU 10 terminates the input-switching task.

As described above, the input switching task according to the embodiment prevents the output of the crank-input event signal when the crank signal is determined to be normal, and allows the output of the crank-input event signal when the crank signal is determined to be abnormal.

(3) Input Dividing Task

Next, the input dividing task to be executed by the CPU 10 will be described hereinafter with reference to FIG. 8. The input dividing task is carried out each time an active edge appears in either the crank-divided event signal outputted from the input dividing module 32 or the crank-input event signal outputted from the input selecting module 20 after the microcomputer 4 has been booted.

As well as the input signal diagnosing task, the input dividing task is carried out each time the level of either crank-divided event signal or the crank-input event signal is changed in a predetermined same direction, such as a low-to-high direction, after the microcomputer 4 has been booted.

When launching the input dividing tasks the CPU 10 refers to the information indicative of the diagnosis of the crank signal stored in the flash ROM 16 or the RAM 18 by the operations in steps S140 or S150, thereby checking whether the crank signal is normal based on the referred result in step S310.

Upon determining that the crank signal is normal (YES in step S310), the CPU 10 determines whether a pulse-missing portion appears in the crank signal in step S320; this pulse-missing portion includes: a k-times time interval between temporally adjacent active edges; and their temporally adjacent active edges.

For example, the CPU 10 reads out the count value of the angular counter 28c, and determines that a pulse-missing portion appears in the crank signal when the readout count value corresponds to an active edge immediately before or after one of temporally adjacent active edges of a pulse-missing portion.

As another example, like step S120, the CPU 10 determines that a pulse-missing portion appears in the crank signal according to when an interrupt is inputted thereto from the pass-angle measuring module 26 or the crank measuring module 34.

Upon determining that a pulse-missing portion appears in the crank signal ES in step S320), the CPU 10 sets the dividing ratio n of the register 32b to 5 in step S330. Thereafter, the CPU 10 sends, to the angle clock generator 12, an instruction to allow the angle clock generator 12 to output the crank-divided event signal in step S340.

In response to receiving the instruction to allow the angle clock generator 12 to output the crank-divided event signal, the angle clock generator 12 sets the flag stored in the register 32b to "1". The flag of "1" enables the input dividing module 32 to output the crank-divided event signal to the at least one external element, such as the CPU 10. Thereafter, the CPU 10 terminates the input dividing task.

Otherwise, upon determining that a pulse-missing portion does not appear in the crank signal (NO in step S320), the CPU 10 sets the dividing ratio n of the register 32b to 1 in step S350. Thereafter, the CPU 10 sends, to the angle clock generator 12, an instruction to allow the angle clock generator 12 to output the crank-divided event signal in step S340, terminating the input dividing task.

In response to receiving the instruction to allow the angle clock generator 12 to output the crank-event input signal, the angle clock generator 12 sets the flag stored in the register 32b to "1". The flag of "1", enables the input dividing module 32 to output the crank-divided event signal to the at least one external element, such as the CPU 10.

Otherwise, upon determining that the crank signal is abnormal (NO in step S310), the CPU 10 prevents the output of the crank-divided event signal in step S360.

For example, the CPU 10 sends, to the angle clock generator 12, an instruction to prevent the angle clock generator 12 from outputting the crank-divided event signal in step S360.

In response to receiving the instruction to prevent the angle clock generator 12 from outputting the crank-divided event signal, the angle clock generator 12 sets the flag stored in the register 32b to "0". The flag of "0" disables the input dividing module 32 to output the crank-divided event signal to the at least one external element, such as the CPU 10. Thereafter, the CPU 10 terminates the input dividing task.

As described above, contrary to the input switching task, the input dividing task according to the embodiment allows the output of the crank-divided event signal when the crank signal is determined to be normal, and prevents the output of the crank-divided event signal when the crank signal is determined to be abnormal.

Specifically, while the crank signal is normally outputted from the input selecting module 20 (YES in step S310), the output of the crank-divided event signal is allowed (see step S340). Then, the crank-divided event signal having a period determined based on whether a pulse-missing portion appears in the crank signal is outputted (see steps S320 to S350).

More specifically, when a pulse-missing portion does not appear in the crank signal, "5" is set to the dividing ratio of the register 32*a* of the input dividing module 32 (see step S350). Thus, the crank-divided event signal generated by dividing the crank signal by the dividing ratio of "5" is outputted (see FIG. 2).

In contrast, when a pulse-missing portion appears in the crank signal, "1" is set to the dividing ratio of the register 32*a* of the input dividing module 32 (see step S330). Thus, the crank-divided event signal generated by dividing the crank signal by the dividing ratio of "1", that is, synchronized with the crank signal is outputted (see pulse missing portions in FIG. 2).

In addition, while the crank signal is abnormally outputted from the input selecting module 20 (NO in step S310), the output of the crank-divided event signal is disabled (see step S360), resulting in that no crank-divided event signal is outputted (see the period "C" and the period "D").

Thereafter, when the crank signal is returned to be normally outputted from the input signal selecting module 20, the output of the crank-divided event signal is allowed again (see step S340). Then, the crank-divided event signal having a period determined based on whether a pulse-missing portion appears in the crank signal is outputted (see steps S320 to S350 and the period "E" in FIG. 9).

Next, transitions of the signals related to the diagnosis of the crank signal will be described hereinafter with reference to FIG. 9.

First, when the crank signal is normally inputted to the CPU 10 from the input selecting module 20 (YES in step S210 of FIG. 7), the crank signal is selected by the input selecting module 20 as the input signal (see step S220 of FIG. 7), and the output of the crank-input event signal is disabled (see step S230 of FIG. 7). Thereafter, the angle clock is generated based on the crank signal.

Figure 8:
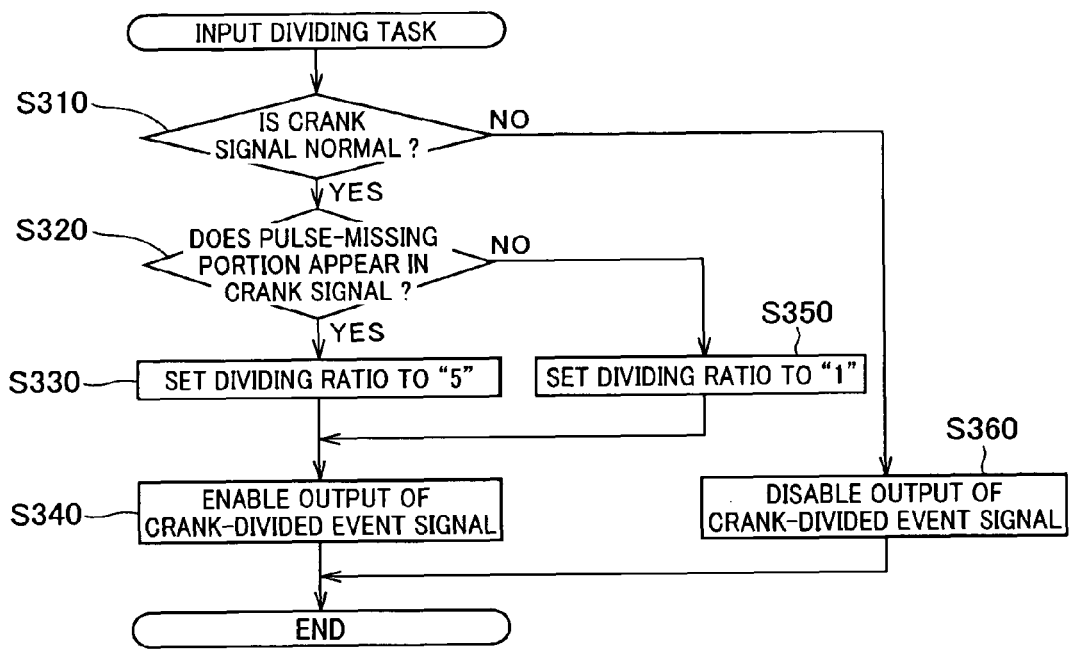
FIG. 8 is a flowchart schematically illustrating an input dividing task to be executed by the CPU illustrated in FIG. 1.

While the crank signal is normal, the output of the crank-input event signal is disabled, but the output of the crank-divided event signal is enabled (see steps S310 to S340 of FIG. 8). For this reason, the input signal diagnosing task and the input switching task are activated each time a specified level change occurs in the crank-divided event signal.

Specifically, each time a specified level change appears in the crank-divided event signal, the value of the active-edge count variable is incremented by the active-edge count unit so as to be integrated (see step S110 of FIG. 5). When a pulse-missing portion appears in the crank signal during the value of the active-edge count variable being integrated (see YES in step S120 of FIG. 5), it is checked whether the crank signal is normal based on the integrated value of the active-edge count variable (see steps S130 to S150 of FIG. 5 and the period "A" in FIG. 9).

At the check, when the crank signal is normal, the integrated value of the active-edge count variable is within the proper range (see YES in step S130 of FIG. 5). For this reason, after it has been determined that the crank signal is normal (see step S140 of FIG. 5), the value of the active-edge count variable is reset (see step S160 of FIG. 5).

Thereafter, when a failure occurs in the crank signal so that the integrated value of the active-edge count variable is out of the proper range (NO in step S130 of FIG. 5), it is determined that the crank signal is abnormal (see step S150 of FIG. 5). After the abnormal determination, the value of the active-edge count variable is reset (see step S160 of FIG. 5 and the transition of the period "B" to the period "C" in FIG. 9).

After it has been determined that the crank signal is abnormal, the cam-edged signal is selected by the input selecting module 20 as the input signal (see step S240 of FIG. 7), and the output of the crank-input event signal is enabled (see step S250 of FIG. 7). In addition, after it has been determined that the crank signal is abnormal, the output of the crank-divided event signal is disabled (see step S360 of FIG. 8 and the period "C" in FIG. 9). Thereafter, the angle clock is generated by the angle clock generating unit 12 based on the cam-edged signal.

After the cam-edged signal has been selected as the input signal from the input selecting module 20, each time a specified level change appears in the crank-input event signal, the value of the active-edge count variable is incremented by the active-edge count unit so as to be integrated (see step S110 of FIG. 5). When a pulse-missing portion appears in the crank signal during the value of the active-edge count variable being integrated (see YES in step S120 of FIG. 5), it is checked whether the crank signal is normal based on the integrated value of the active-edge count variable (see steps S130 to S150 of FIG. 5 and the period "D" in FIG. 9).

Thereafter, while the angle clock is generated based on the cam-edged signal, the check of the crank signal is repeatedly carried out each time a specified level change appears in the crank-input event signal (see steps S110 to S160 of FIG. 5). During the repeated check, when it is determined that the crank signal is normal (see step S140 of FIG. 5), the crank signal is selected by the input selecting module 20 again as the input signal (see step S220 of FIG. 7).

Figure 9:
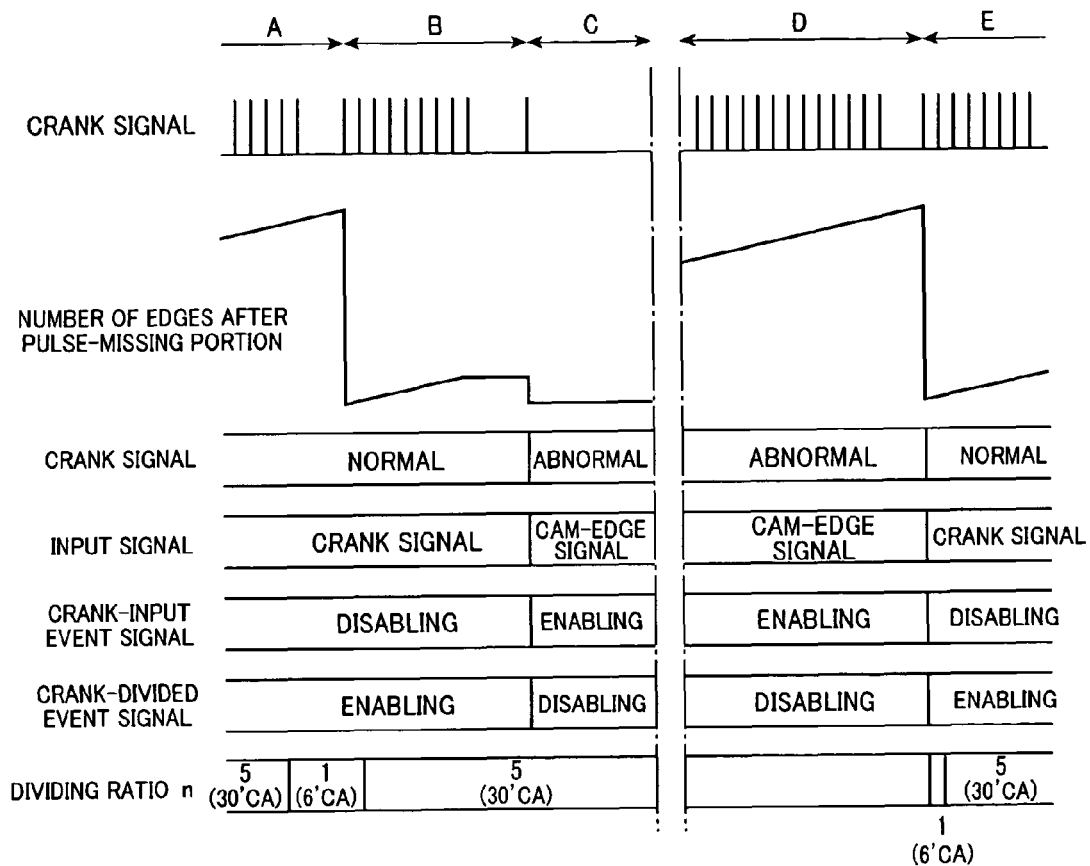
FIG. 9 is a time chart schematically illustrating transitions of signals related to the diagnosis task for the crank signal.

Thereafter, as described above, the angle clock is generated based on the crank signal while the check of the crank signal is repeatedly carried out (see the period "E" of FIG. 9).

In the embodiment, the microcomputer 4 according to the embodiment is for example configured to determine whether an abnormality occurs in the crank signal based on the number of specified level changes in the crank signal during a period between one of the pulse-missing portions and the next one of the pulse-missing portions.

However, the microcomputer 4 can be configured to carry out the determination based on the number of specified level changes in the crank signal during an alternative period.

Specifically, for example, the microcomputer 4 can be configured to determine whether an abnormality occurs in the crank signal based on the number of specified level changes in the crank signal during a period. The period is required for, for example, the first cam signal (the cam-edged signal or second cam signal) to rotate by a predetermined ante, such as an angle corresponding to one operating cycle of the engine.

Figure 10:
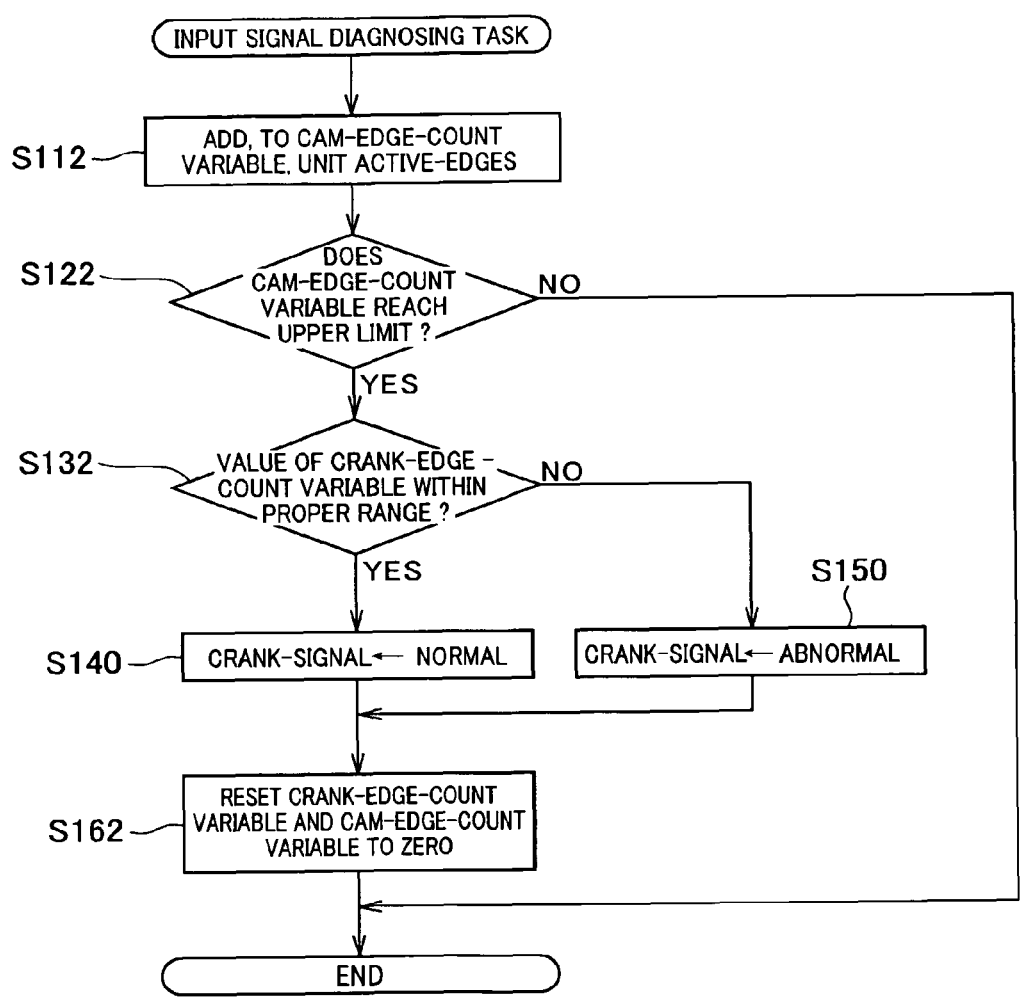
FIG. 10 is a flowchart schematically illustrating a modified input signal diagnosing task to be executed by the CPU illustrated in FIG. 1.

FIG. 10 schematically illustrates a modified input signal diagnosing task to be executed by the CPU 10.

First, like step S110 of FIG. 5, the microcomputer 4 is configured such that, each time a specified level change appears in the crank-divided event signal or the crank-input event signal, the value of a crank-edge count variable as the active-edge count variable is incremented by the active-edge count unit so as to be integrated.

In addition, the input selecting module 20 is configured to output, for example, the first cam signal or a signal whose level transiently varies in time in a predetermined same direction, such as a low-to-high direction, each time a level-variation appears in the first cam signal in the same direction. The modified input signal diagnosing task is carried out each time an active edge appears in the first cam signal after the microcomputer 4 has been booted (see FIG. 10).

When launching the modified input signal diagnosing task, the CPU 10 adds, to a value, such as "1", of a cam-active-edge count variable whose default value is zero, the number of specified-level changes (unit active-edges) in the first cam signal in step S112 of FIG. 10.

Next, the CPU 10 checks whether the value of the cam-active-edge count variable reaches an upper count corresponding to a specified rotation angle of the first cam shaft CM1 in step S122. For example, as the specified rotation angle, the rotation angle of the first cam shaft CM1 during one operating cycle of the engine.

Upon determining that the value of the cam-active-edge count variable does not reach the upper count corresponding to the specified rotation angle of the first cam signal (NO in step S122), the CPU 10 terminates the modified input signal diagnosing task.

Thereafter, each time an active edge appears in the first cam signal, the modified input signal diagnosing task is activated so that the value of the cam-active-edge count variable is repeatedly incremented by the active-edge count unit.

As a result of the repeated increment, when it is determined that the value of the cam-active-edge count variable reaches the upper count (YES in step S122), the CPU 10 determines whether the value of the crank-active-edge count variable is within a proper range in step S132. The proper range means an estimated range within which the number of proper specified-level changes (active edges) in the crank signal during a period required for the first cam shaft to rotate by a predetermined angle, such as an angle corresponding to one operating cycle of the engine is.

Upon determining that the value of the crank-active-edge count variable is within the proper range (YS in step S132), the CPU 10 stores, in the RAM 18 or the flash ROM 16, information representing that the diagnosis of the crank signal is "normal" in step S140, proceeding to step S162.

Otherwise, upon determining that the value of the crank-active-edge count variable is not within the proper range (NO in step S132), the CPU 10 stores, in the RAM 18 or the flash ROM 16, information representing that the diagnosis of the crank signal is "abnormal" in step S150, proceeding to step S162.

After the operation in step S140 or S150, the CPU 10 resets each of the cam-active-edge count variable and crank-active-edge count variable to the default value of zero, terminating the modified input signal diagnosing task.

(4) Crank-Edge Interrupt Task

A crank-edge interrupt task will be described hereinafter with reference to FIG. 11. The instructions allow the CPU 10 to execute the crank-edge interrupt task each time an active edge appears in the crank signal output from the input selecting module 20 as the input signal (see step S220 in FIG. 7) after the microcomputer 4 has been booted.

When an appearance of an active edge in the crank signal (input signal) triggers to launch the crank-edge interrupt task program, the CPU 10 determines whether the trigger active edge represents the end of a pulse-missing portion M in the crank signal in step S410.

As described above, as clearly seen in FIG. 6, the time interval of the pulse-missing portion Ma in the crank signal is longer than the intervals of the other portions except for the pulse-missing portions M therein. For this reason, the count value T12 corresponding to the time interval of the pulse-missing portion Ma in the crank signal is greater than the other count values each corresponding to one of the other portions therein.

As described above, a measured value (count value) of the pass-angle measuring counter 26a depends on a corresponding time interval between temporally adjacent same-directed edges in the crank signal. For this reason, a count value of the pass-angle measuring counter 26a corresponding to the time interval of the pulse-missing portion Ma in the crank signal is greater than that of the counter 26a corresponding to another time interval of one of the other portions in the crank signal.

In addition, the default ($\Delta\theta \times 2.5$) of the threshold value stored in the threshold register 26b is greater than the reference count value that the pass-angle measuring counter 26a can reach while no pulse-missing portions M appear in the crank signal, and smaller than the specified count value that the counter 26a can reach while one of the pulse-missing portions M appears in the crank signal.

For this reason, the count value of the pass-angle measuring counter 26a corresponding to the time interval of the pulse-missing portion Ma in the crank signal exceeds the specified count value greater than the default ($\Delta\theta \times 2.5$) of the threshold value stored in the threshold register 26b.

As a result, when the count value of the pass-angle measuring counter 26a corresponding to the time interval of the pulse-missing portion Ma in the crank signal reaches the default of the threshold value, the pass-angle measuring module 26 generates an interrupt, thereby outputting it to the CPU 10.

Accordingly, when receiving the interrupt output from the pass-angle measuring module 26, the CPU 10 determines that the trigger active edge represents the end of a pulse-missing portion M in the crank signal (the determination in step S410 is YES).

Figure 12:
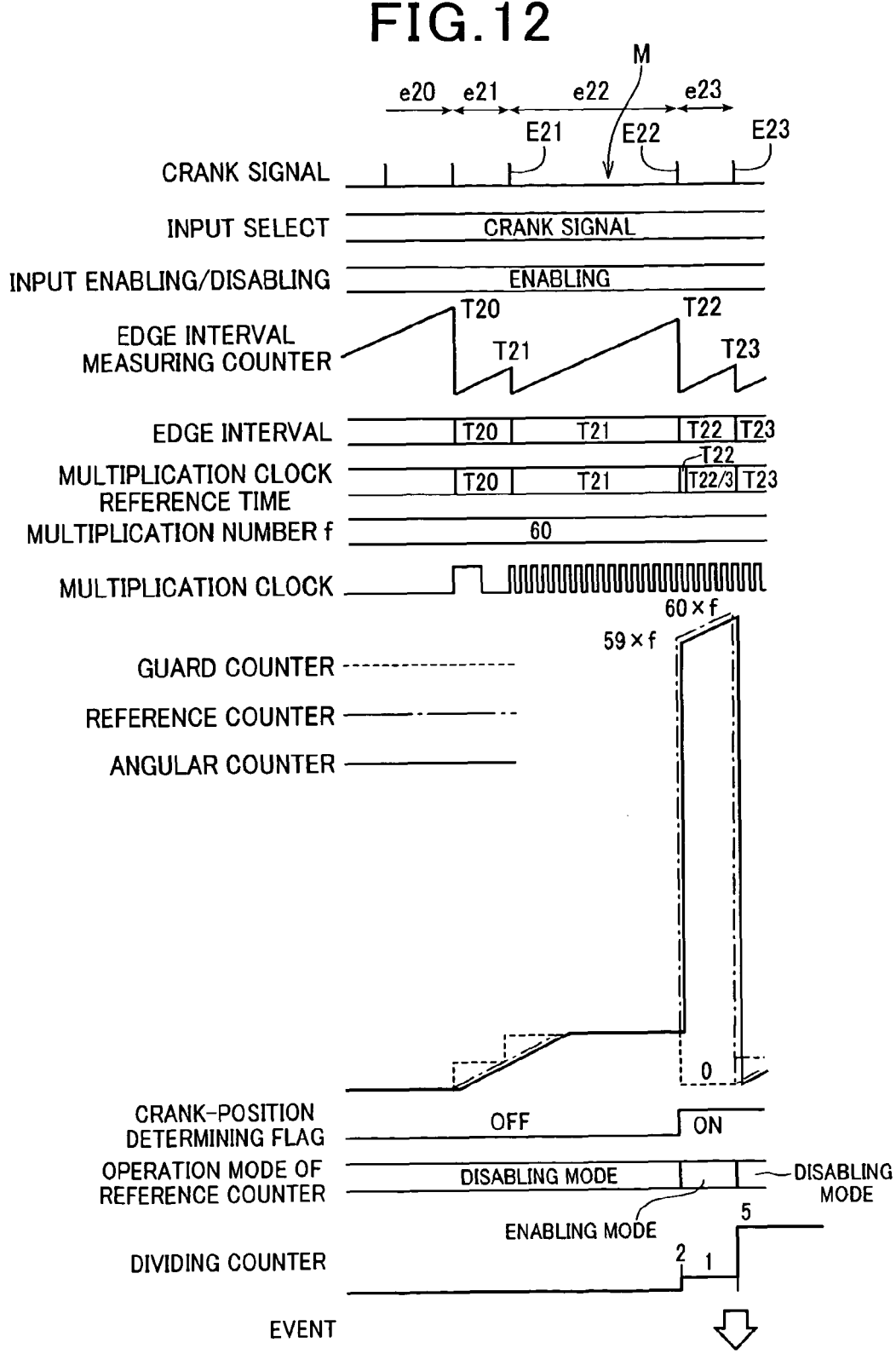
FIG. 12 is a time chart schematically illustrating variations of parameters of the angle clock generating unit with variation of the input signal during the crank-edge interrupt task illustrated in FIG. 11.

For example, as illustrated in FIG. 12, an active edge E22 is the trigger active edge representing the end of a pulse-missing portion M.

Subsequently, the CPU 10 determines whether a crank-position determining flag F1 holds information indicative of OFF in step S420. It is to be noted that the crank-position determining flag F1 is for example set by software in the microcomputer 4 each time the microcomputer 4 is booted. The information indicative of OFF is set as default information of the crank-position determining flag F1 during the microcomputer's start-up process.

If it is determined that the crank-position determining flag F1 holds the information indicative of the default of OFF (the determination in step S420 is YES), the CPU 10 determines a timing immediately after microcomputer startup, proceeding to step S430.

In step S430, the CPU 10 sets the product of "59" and the multiplication number f1, which is set to 60 in the crank-edge interrupt task, to the count value of the reference counter 28a. Similarly, in step 440, the CPU 10 sets the product of "59" and the multiplication number f1, which is set to 60 in the crank-edge interrupt task, to the count value of the angle counter 28c.

The product of "59" and the multiplication number f1 (60) to be set to the count value of the reference counter 28a allows the count value thereof to be cleared (zero) when the next active edge E23 appears in the crank signal. Similarly, the product of "59" and the multiplication number f1 (60) to be set to the count value of the angular counter 28c allows the count value thereof to be cleared (zero) upon an appearance of the next active edge E23 in the crank signal.

Next, the CPU 10 changes the information held by the crank-position determining flag F1 from OFF to ON in step S450.

After the completion of the execution of the instruction in step S450, or a negative determination representing that the crank-position determining flag F1 does not hold the information indicative of OFF in step S420, the CPU 10 sets "0" to the count value of the guard counter 28b in step S460.

The count value of zero (0) set to the guard counter 28b represents a count value that each of the reference counter 28a and the angular counter 28c should take when the next active edge E23 appears in the crank signal.

Specifically, it is assumed that the engine suddenly accelerates at the timing of an appearance of the active edge E22 in the crank signal so that the engine speed suddenly increases. In this assumption, a time interval between the active edge E22 and the next active edge E23 in the crank signal may become short as compared with normal time intervals of active edges therein. This may cause the count value of each of the reference counter 28a and the angular counter 28c not to catch up with zero (0) at the appearance timing of the next active edge E23; each of the counters 28a and 28b should take zero (0) at the appearance timing of the next active edge E23.

In this assumption, according to the embodiment, it is possible to forcibly increase the count value of each of the reference counter 28a and the angular counter 28c to be matched with the guard value of the guard counter 28b at the timing when the next active edge E23 appears in the crank signal. This permits the count value of each of the reference counter 28a and the angular counter 28c to become zero (0) even if a time interval between the active edge E22 and the next active edge E23 in the crank signal becomes short as compared with normal time intervals of active edges therein.

In addition, it is assumed that the engine suddenly decelerates at the timing of an appearance of the active edge E22 in the crank signal so that a time interval between the active edge E22 and the next active edge E23 in the crank signal becomes long as compared with normal time intervals of active edges therein. This may cause the count value of each of the reference counter 28a and the angular counter 28c to exceed, at the next active edge E23, zero (0) that each of the counters 28a and 28b should take at the next active edge E23.

In this assumption, according to the embodiment, it is possible to forcibly stop an increment of the count value of each of the reference counter 28a and the angular counter 28c when the count value reaches the guard value of the guard counter 28b. This permits the count value of each of the reference counter 28a and the angular counter 28c to become zero (0) even if a time interval between the active edge E22 and the next active edge E23 in the crank signal becomes long as compared with normal time intervals of active edges therein.

As described above, the guard counter 28b is configured such that its count value at a timing of an appearance of an active edge in the crank signal represents a value that each of the reference counter 28a and the angular counter 28c should take at a timing of an appearance of the next active edge in the crank signal. This permits the count value of each of the reference counter 28a and the angular counter 28c to be guarded even if the engine suddenly accelerates or decelerates.

After step S460, the CPU 10 sends, to the angle clock module 28 an instruction indicative of the enabling mode in step S470.

The instruction indicative of the enabling mode and received by the angle cloak module 28 allows the module 28 to store, as the mode value, an enabling mode value indicative of the enabling mode in the second register 28e. The enabling mode value stored in the second register 28e permits the reference counter 28a to count in the enabling mode described above even if "0" is set to the count value of the guard counter 28b.

Subsequently, the CPU 10 sends, to the multiplication clock generating module 24, an instruction to correct a multiplication-clock reference time stored in the first register 24a in step S480.

Specifically, the instruction is to set, as the multiplication-clock reference time to be stored in the first register 24a, a value calculated by dividing the count value (measured interval) passed from the edge interval measuring module 22 by a predetermined value.

When receiving the instruction, the multiplication clock generating module 24 works to:

divide, by the predetermined value, the count value passed at a timing from the edge interval measuring module 22; this timing is synchronized with an appearance of an active edge in the crank signal immediately after the reception of the instruction; and store a value calculated by the division in the first register 24a as a corrected multiplication-clock reference time.

Specifically, as illustrated in FIG. 12, the count value corresponding to a time interval, such as a T22, of a pulse-missing portion M in the crank signal is k-times as much as that corresponding to a time interval, such as a T21, of one of the other portions except for the pulse-missing portion M therein. It is to be noted that the width of the time interval "T21" longer than that of the time interval "T22", which is illustrated as "EDGE INTERVAL, in FIG. 12, is independent of the length of the time interval "T21". Specifically, the length of the time interval "T" is longer than that of the time interval "T21" in FIG. 12.

In the embodiment, therefore, the predetermined value is set to k representing a ratio of a time interval between active edges of a pulse-missing portion M in the crank signal to that between active edges of another portion therein; this k is set to 3.

This allows each of the multiplication clock reference times to be substantially constant, so that the multiplication clock whose clock cycle is substantially constant (see "multiplication clock" in FIG. 12).

Next, the CPU 10 sets "2" to a count value of a dividing counter C1 in step S490, proceeding to step S530. For example, the CPU 10 can operate the dividing counter C1 by software (at least one of the programs). An initial value of the dividing counter C1 is set to "0".

Otherwise if it is determined that the trigger active edge does not represent the end of a pulse-missing portion M in the crank signal (the determination in step S410 is NO), the CPU 10 determines whether the trigger active edge represents the head of a pulse-missing portion M in step S500.

In the embodiment, the CPU 10 executes the determination in step S500 by, for example, determining whether the count value of the angular counter 28c represents a rotational position of the crankshaft CS corresponding to the head of a teeth-missing portion 51c. If it is determined that the count value of the angular counter 28c represents the rotational position of the crankshaft CS corresponding to the head of a teeth-missing portion 51c, the CPU 10 determines that the trigger active edge represents the head of a pulse-missing portion M in step S500.

Specifically, if it is determined that the trigger active edge represents the head of a pulse-missing portion M (the determination in step S500 is YES), the CPU 10 sets the product of "59" and the multiplication number f1, which is set to 60 in the crank-edge interrupt task, to the count value of the guard counter 28b in step S510.

This is because the count value of the reference counter 28a and the angular counter 28c should take the product of "59" and the multiplication number f1 (60) when the next active edge corresponding to the end of a pulse-missing portion M appears in the crank signal.

After the completion of the execution of the instruction in step S510, or a negative determination in step S500, the CPU 10 sends, to the angle clock module 2S an instruction indicative of the disabling mode in step S520. Then, the CPU 10 proceeds to step S530.

The instruction indicative of the disabling mode and received by the angle clock module 28 allows the module 28 to store, as the mode value, a disabling mode value indicative of the disabling mode in the second register 28e. The disabling mode value stored in the second register 28e permits the reference counter 28a to count in the disabling mode described above.

In step S530, the CPU 10 determines whether the crank-position determining flag F1 holds the information indicative of ON.

If it is determined that the crank-position determining flag F1 holds the information indicative of ON (the determination in step S530 is YES), the CPU 10 decrements the count value of the dividing counter C1 by 1 in step S540, proceeding to step S550.

In step S550, the CPU 10 checks whether the count value of the dividing counter C1 is set to "0".

If it is checked that the count value of the dividing counter C1 is set to "0" (the determination in step S550 is YES), the CPU 10 goes to step S560. In step S560, the CPU 10 generates an event that determines an activation timing for one of the individual control targets associated with engine control, such as an injector and/or an igniter for a corresponding one of the individual cylinders.

In parallel to the crank-edge interrupt task, the CPU 10 according to the embodiment is programmed to:

compute a proper standby period and a proper active period for each of the individual control targets based on the measurement signals input from the input circuit 2; and set the computed standby and active periods for a corresponding one of the control targets to respective count values of the first and second timers of the timer output unit 14 each time the event is generated by the crank-edge interrupt task.

When the count values are set to the first and second timers for a corresponding one of the control targets, the timer output unit 14 works to:

stand by for outputting the active time for a corresponding one of the control targets until the standby period therefor has elapsed based on the count value of the first timer; and output, to the output circuit 3, an instruction to activate a corresponding one of the control targets for the activate period therefor based on the count value of the second timer.

The output circuit 3 works to:

receive the instruction for a corresponding one of the control targets; and activate a corresponding one of the control targets for the activate period therefor based on the received instruction.

After the completion of the execution of the instruction in step S560, the CPU 10 sets, for example, "5" to the count value of the dividing counter C1 in step S570. "5" to be set to the count value of the dividing counter C1 allows the CPU 10 to output an event at regular intervals of 30 degrees crank angle. The regular intervals of 30 degrees crank angle will be referred to as "event intervals" hereinafter.

After the completion of the execution of the instruction in S570, a negative determination representing that the crank-position determining flag F1 is set to ON in step S530, or a negative determination representing that the count value of the dividing counter C1 is different from "0" in step S550, the CPU 10 exits the crank-edge interrupt task.

Specific operations of the respective modules 22, 24, 26, 26 and 28 under control of the CPU 10 and variations of the parameters, such as the count values of the counters 22a, 28a, 28b, and 28c, will be described hereinafter with reference to FIGS. 11, 12, and 13.

Immediately after the microcomputer 4 has been booted (see a section e20 in FIG. 12), the pass-angle measuring module 26 does not normally operate and the angular counter 28c does not execute counting operation. For this reason, the determinations in step S410 and S500 are respective negative, so that execution of the CPU 10 is shifted to the instruction in step S530 via that in step S520.

At that time, because the crank-position determining flag F1 holds the information indicative of OFF as the default information, the determination in step S530 is NO, so that the crank-edge interrupt task is exited.

Thereafter, the instructions in step S410, S500, S520, and S530 are repeatedly executed by the CPU 10 in this order each time an active edge appears in the crank signal (see a section e21 in FIG. 12).

During the repeat execution of the instructions in steps S410, S500, S520, and S530, the count value of the pass-angle measuring counter 26a exceeds the threshold value stores in the threshold register 26b before an active edge E22 appearing in the crank signal represents the end of a pulse-missing portion M (see in FIG. 6). During the repeat execution of the instructions in steps S410, S500, S520, and S530, it is to be noted that, because the count value of the angular counter 28c does not represent the head of a pulse-missing portion M, the determination in step S500 is negative.

In FIG. 6, for example, a reference character E13 is assigned to an active edge appearing in the crank signal represents the end of a pulse-missing portion M.

This allows the pass-angle measuring module 26 to generate an interrupt, and to output it to the CPU 10. Thus, the interrupt is received by the CPU 10 so that, when the active edge E22 appears in the crank signal after receipt of the interrupt, it is determined that the active edge E22 represents the end of a pulse-missing portion M in the crank signal (the determination in step S410 is YES). Thus, execution of the CPU 10 is shifted to step S420 and later.

At that time, because the crank-position determining flag F1 is set to the information indicative of OFF, the determination in step S420 is affirmative, so that execution of the CPU 10 is shifted to step S430.

In step S430, the count value of the reference counter 28a is set to the product of "59" and the multiplication number f1 (60), and the count value of the angular counter 28c is set to the product of "59" and the multiplication number f1 (60) in step S440. Thereafter, the crank-position determining flag F1 is set to the information indicative of ON in step S450.

Next, in step S460, the count value of the guard counter 28b is set to "0", and the reference counter 28a executes the count-up operation in the enabling mode in step S470.

Even if the count value of the guard counter 28b is set to "0" in step S360, because the operating mode of the reference counter 28a is set to the enabling mode in step S470, the reference counter 28a continuously counts up until the count value reaches the upper limit stored in the first register 28d (see a section e23 in FIG. 12).

Next, the multiplication-clock reference time is corrected from T22 to T22/3 in step S480 (see "T22/3" in FIG. 12), and thereafter, execution of the CPU 10 is shifted to step S530. At the shift timing, because the crank-position determining flag F1 is set to the information indicative of ON, the determination in step S530 is YES, so that the dividing counter C1 is decremented by 1 in step S540.

The decrement allows the count value of the dividing counter C1 to be turned from "2" set in step S490 immediately before step S530 to "1". At that time, because the count value of the dividing counter C1 dose not become "0", the determination in step S550 is NO, so that the crank-edge interrupt task is exited.

When the next active edge E23 appears in the crank signal corresponding to the rotation of the crankshaft CS by Δθ degrees crank angle (see FIG. 12), the count value of each of the reference counter 28a and the angular counter 28c is incremented from the product of "59" and the multiplication number f1 (60) to the product of "60" and the multiplication number f1 (60). The product of "60" and the multiplication number f1 (60) is matched with the upper limit of each of the reference counter 28a and the angular counter 28c stored in the first register 28d. For this reason, the count value of each of the reference counter 28a and the angular counter 28c is cleared (zero) in synchronization with the active edge E23 appearing in the crank signal (see FIG. 12).

In addition, when the next active edge E23 appears in the crank signal corresponding to the rotation of the crankshaft CS by Δθ degrees crank angle, the determinations in step S410 and S500 are respectively negative, so that the operation mode of the reference counter 28a is returned from the enabling mode to the disabling mode in step S520.

Thereafter, at that time, because the crank-position determining flag F1 is set to the information indicative of ON, the determination in step S530 is YES, so that the dividing counter C1 is decremented by 1 in step S540.

The decrement allows the count value of the dividing counter C1 to be turned from "1" set in step S540 to "0". Because the count value of the dividing counter C1 becomes "0", the determination in step S550 is YES, so that events that determine activation timings for the individual control targets associated with engine control are generated in step S560. Thereafter, the count value of the dividing counter C1 is set to "5" in step S570, the crank-edge interrupt task is exited.

As described above, after the affirmative determination in which an active edge represents the end of a pulse-missing portion M in the crank signal after microcomputer startup in step S410, the instructions in step S410, S500, and S520 to S570 are repeatedly executed by the CPU 10 in this order each time an active edge appears in the crank signal. The repeat execution of the instructions in step S410, S500, and S520 to S570 is stopped at step S500 when an active edge appearing in the crank signal represents the head of a pulse-missing portion M therein (see a section e24 in FIG. 13).

When an active edge (E25) (see FIG. 13) appearing in the crank signal represents the head of a pulse-missing portion M therein (the determination in step S500 is YES), the count value of the guard counter 28b is set to the product of "59" and the multiplication number f1 (60) in step S510. Thereafter, the instructions S520 to S570 are executed by the CPU 10 (see a section e25 in FIG. 13).

Thereafter, when the next active edge (E26) appears in the crank signal, it is determined that the active edge (E26) represents the end of the pulse-missing portion (the determination in step S410 is YES). At that time, because the crank-position determining flag F1 is set to the information indicative of ON, the determination in step S420 is NO, so that execution of the CPU 10 is shifted to step S460.

Figure 13:
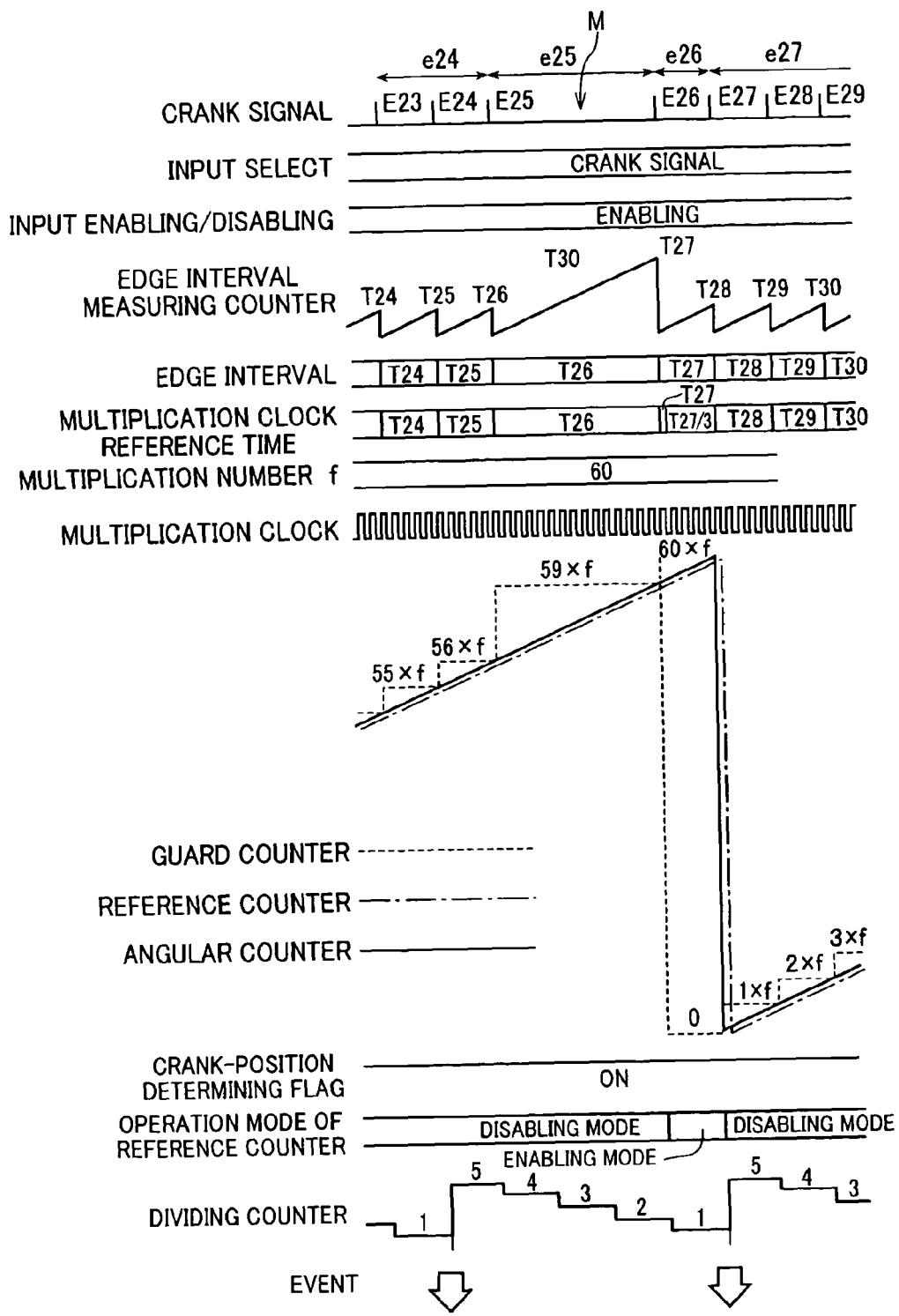
FIG. 13 is a time chart schematically illustrating variations of parameters of the angle clock generating unit with variation of the input signal during the crank-edge interrupt task illustrated in FIG. 11.

Thereafter, as described above, the reference counter 28a continuously counts up with the count value of the guard counter 28b unchanged until the count value of the reference counter 28a is cleared (zero) (see a section e26 in FIG. 13). Thereafter, as described above, the instructions in steps S410, S500, and S520 to S570 are repeatedly executed by the CPU 10 until it is determined that an active edge appearing in the crank signal represents the head of a pulse-missing portion M (see a section e27 in FIG. 13).

(5) Cam-Edge Interrupt Task

A cam-edge interrupt task will be described hereinafter with reference to FIG. 14. The instructions allow the CPU 10 to execute the cam-edge interrupt task each time an active edge appears in the cam-edge is signal output from the input selecting module 20 as the input signal (see step S240 in FIG. 7) after the microcomputer 4 has been booted.

When an appearance of an active edge in the cam-edge signal (input signal) triggers to launch the cam-edge interrupt task program, the CPU 10 determines whether a cam-position determining flag F2 holds information indicative of OFF in step S610. It is to be noted that the cam-position determining flag F2 is for example set by software in the microcomputer 4 each time the microcomputer 4 is booted. The information indicative of OFF is set as default information of the cam-position determining flag F2 during the microcomputer's start-up process.

If it is determined that the cam-position determining flag F2 holds the information indicative of the default of OFF (the determination in step S610 is YES), the CPU 10 determines a timing immediately after microcomputer sap, proceeding to step S620.

In step S620, the CPU 10 determines whether the count value of the guard counter 28b is equal to or greater than two-times the multiplication number f2, which is set to 1200 in the cam-edge interrupt task in the second register 24b described above. In other words, the CPU 10 determines whether the count value of the guard counter 28b is equal to or greater than 2400 (=2×1200). As a default, the count value of the guard counter 28b is set to "0".

If it is determined that the count value of the guard counter 28b is equal to or greater than two-times the multiplication number f2 (the determination in step S620 is YES), the CPU 10 proceeds to step S630.

In step S630, the CPU 10 sets initial values to the respective count values of the reference counter 28a, the guard counter 28b, and the angular counter 28c in step S630.

Specifically, in the embodiment, it is determined in advance that each active edge in the cam-edge signal corresponds to:

which of the first and second cam signals; and which of rising and trailing edges in any one of the first and second cam signals; and which of the high and low levels of the other of the first and second cam signals.

Moreover, in the embodiment, initial values to be stored in the reference counter 28a are determined beforehand for the respective active edges in the cam-edge signal. Similarly, initial values to be stored in the guard counter 28b are determined beforehand for the respective active edges in the cam-edge signal, and initial values to be stored in the angular counter 28c are determined beforehand for the respective active edges in the cam-edge signal.

FIG. 15 schematically illustrates correspondences between the individual initial values of the respective counters 28a to 28c and the individual active edges in the cam-edge signal in a table format.

Specifically, when an active edge appearing in the cam-edge signal corresponds to a rising edge in the first cam signal while the second cam signal is in the low level at one of the change points P, the initial values of the counters 28a, 28b, and 28c are respectively set to "6000", "0", and "6000,".

When an active edge appearing in the cam-edge signal corresponds to a rising edge in the first cam signal while the second cam signal is in the high level at one of the change points P, the initial values of the counters 28a, 28b, and 28c are respectively set to "3600", "4800", and "3600".

When an active edge appearing in the cam-edge signal corresponds to a trailing edge in the first cam signal while the second cam signal is in the low level at one of the change points Q, the initial values of the counters 28a, 28b, and 28c are respectively set to "5700", "6900", and "5700".

When an active edge appearing in the cam-edge signal corresponds to a trailing edge in the first cam signal while the second cam signal is in the high level at one of the change points P, the initial values of the counters 28a, 28b, and 28c are respectively set to "1200", "2400", and "1200".

In addition, when an active edge appearing in the cam-edge signal corresponds to a rising edge in the second cam signal while the first cam signal is in the low level at one of the change points P, the initial values of the counters 28a, 28b, and 28c are respectively set to "2400", "3600", and "2400".

When an active edge appearing in the cam-edge signal corresponds to a rising edge in the second cam signal while the first cam signal is in the high level at one of the change points P, the initial values of the counters 28a, 28b, and 28c are respectively set to "0", "1200", and "0".

When an active edge appearing in the cam-edge signal corresponds to a trailing edge in the second cam signal while the first cam signal is in the low level at one of the change points Q, the initial values of the counters 28a, 28b, and 28c are respectively set to "2100", "3300", and "2100".

When an active edge appearing in the cam-edge signal corresponds to a trailing edge in the second cam signal while the first cam signal is in the high level at one of the change points P, the initial values of the counters 28a, 28b, and 28c are respectively set to "4800", "6000", and "4800".

It is to be noted that "rising edge" and "trailing edge" are respectively represented by the mark "↑" and the mark "↓" in FIG. 12, and that "low level" and "high level" are respectively represented by the characters "L" and "H" in FIG. 12.

In the embodiment, for example, data indicative of the correspondences between the individual initial values of the respective counters 28a to 28c and the individual active edges in the cam-edge signal are stored in advance in a table T. Moreover, the table T is for example stored beforehand in the flash ROM 16.

Specifically, in step S630, the CPU 10 references the data of the table T to read out initial values for the respective counters 28a to 28c; these readout initial values correspond to a current active edge appearing in the cam-edge signal. Then, the CPU 10 stores the readout initial values in the corresponding counters 28a to 28c, respectively in step S630.

Thereafter, the CPU 10 changes the information held by the cam-position determining flag F2 from OFF to ON in step S640, proceeding to step S670

Otherwise if it is determined that the count value of the guard counter 28b is smaller than two-times the multiplication number f2 (the determination in step S620 is NO), the CPU 10 proceeds to step S670 while skipping the instructions in steps S630 and S640.

Otherwise if it is determined that the cam-position determining flag F2 holds the information indicative of ON (the determination in step S610 is NO), the CPU 10 shifts to step S650.

In step S650, the CPU 10 determines whether the count value of the guard counter 28b is equal to or greater than the product of the multiplication number f2 (1200) and the number of cylinders, which is 6 in the embodiment. In other words, the CPU 10 determines whether the count value of the guard counter 28b is equal to or greater than 7200 (=6×1200).

If it is determined that the count value of the guard counter 28b is equal to or greater than the product of the multiplication number f2 (1200) and the number (6) of cylinders (the determination in step S650 is YES), the CPU 10 goes to step S660. In step S660, the CPU 10 sets "0" to the count value of the guard counter 28b in step S660, proceeding to step S670.

Otherwise if it is determined that the count value of the guard counter 28b is smaller than the product of the multiplication number f2 (1200) and the number (6) of cylinders (the determination in step S550 is NO), the CPU 10 goes to step S670 while skipping the instruction in step S660.

In step S670, the CPU 10 checks whether the count value of the guard counter 28b is "0".

If it is determined that the count value of the guard counter 28b is set to "0" (the determination in step S670 is YES), the CPU 10 sends, to the angle clock module 28 an instruction indicative of the enabling mode in step S680 similar to step S470. This allows the reference counter 28a to count in the enabling mode described above even if "0" is set to the count value of the guard counter 28b.

Otherwise if it is determined that the count value of the guard counter 28b is different from "0" (the determination in step S670 is NO), the CPU 10 sends, to the angle clock module 28 an instruction indicative of the disabling mode in step S690 similar to step S520. This permits the reference counter 28a to count in the disabling mode described above.

After the establishment of the operating mode of the reference counter 28a in step S680 or S690, the CPU 10 determines whether the trigger active edge represents a change point immediately before a change point Q in step S700. In other words, the CPU 10 determines whether the trigger active edge represents an active edge whose next active edge corresponds to a change point Q in step S700.

Figure 16:
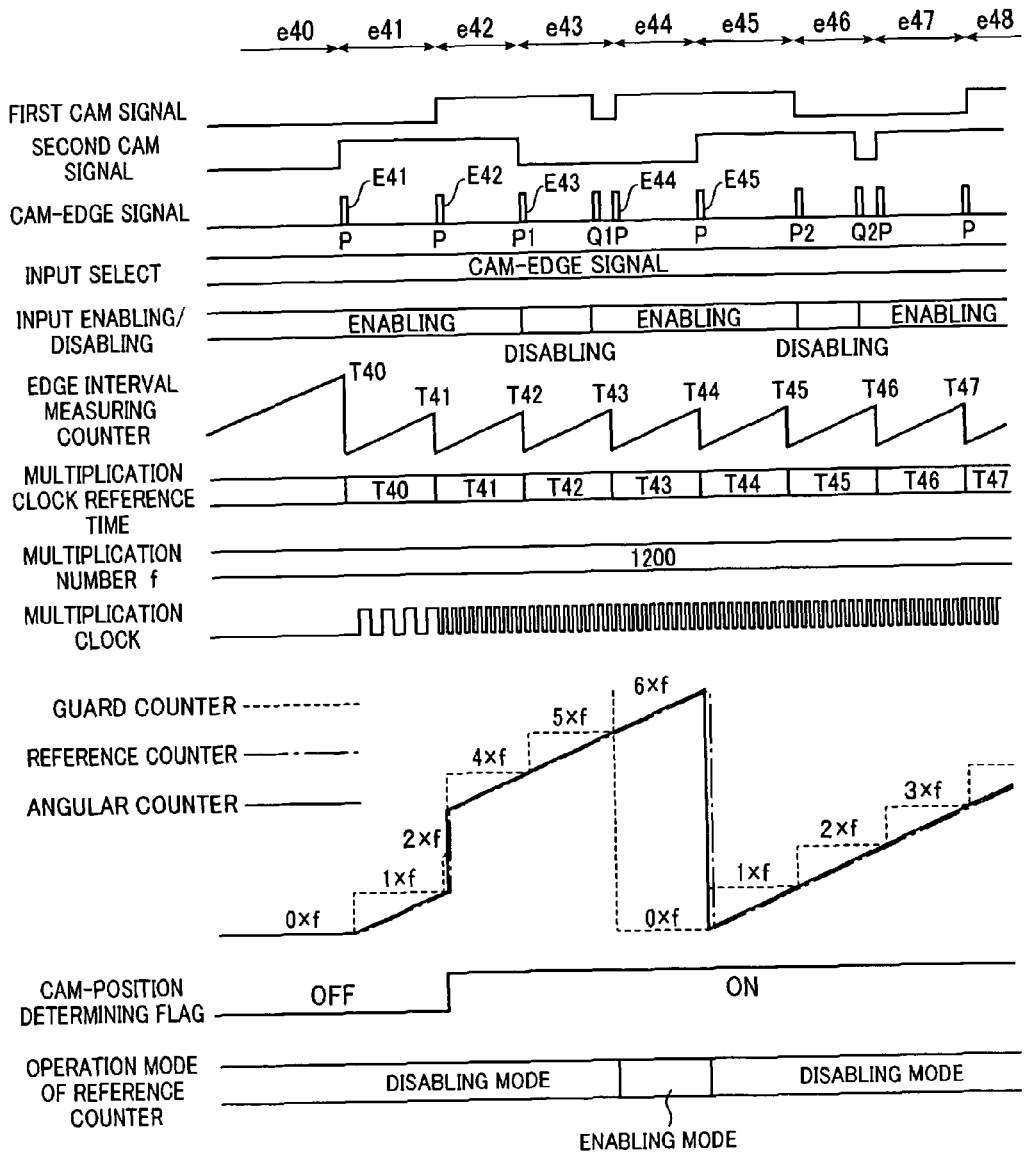
FIG. 16 is a time chart schematically illustrating variations of parameters of the angle clock generating unit with variation of the input signal during the cam-edge interrupt task illustrated in FIG. 14.

In the embodiment, as illustrated in FIGS. 2, 15, and 16, the change points Q consist of:

a change point Q1 at which the level of the first cam signal transiently changes in the high-to-low direction while the second cam signal is in the low level; and a change point Q2 at which the level of the second cam signal transiently changes in the high-to-low direction while the first cam signal is in the low level.

Thus, a change point P1 at which the level of the second cam signal transiently changes in the high-to-low direction while the first cam signal is in the high level is a change point immediately before the change point Q1. Similarly, a change point P2 at which the level of the first cam signal transiently changes in the high-to-low direction while the second cam signal is in the high level is a change point immediately before the change point Q2.

For example, in step S700, the CPU 10 references the data of the table T to determine whether the tier active edge represents a change point immediately before a change point Q based on the result of the reference.

If it is determined that the trigger active edge represents a change point immediately before a change point Q (the determination in step S700 is YES), the CPU 10 proceeds to step S710. In step S710, the CPU 10 sends, to the input selecting module 20 an instruction to rewrite the at least one bit data stored in the register 20b into "0" from the default of "1".

The data "0" prevents the input selecting module 20 from passing the crank signal and the cam-edge signal to the modules 22, 24, 26, 28, 32, and 34.

Otherwise if it is determined that the trigger active edge does not represent a change point immediately before a change point Q (the determination in step S700 is NO), the CPU 10 proceeds to step S720. In step S720, the CPU 10 holds the default "1" of the at least one bit data unchanged, which allows the input selecting module 20 to continuously pass the crank signal and the cam-edge signal to the modules 22, 24, 26, 28, 32, and 34.

After the establishment of the operating state of the input selecting module 20 in step S710 or S720, the CPU 10 determines whether the cam-position determining flag F2 holds the information indicative of ON and the trigger active edge does not correspond to a change point Q in step S730.

If it is determined that either the cam-position determining flag F2 holds the information indicative of OFF or the trigger active edge corresponds to a change point Q (the determination in step S730 is NO), the CPU 10 exits the cam-edge interrupt task.

Otherwise if it is determined that the cam-position determining flag F2 holds the information indicative of ON and the trigger active edge does not correspond to a change point Q (the determination in step S730 is YES), the CPU 10 goes to step S740.

In step 740, the CPU 10 checks whether a count value of an event counter C2 is greater than "0". For example, the CPU 10 can operate the event counter C2 by software (at least one of the programs). In the embodiment, the CPU 10 sets, as a default, "0" to the count value of the event counter C2.

If it is determined that the count value of the event counter C2 is greater than "0" (the determination in step S740 is YES), the CPU 10 generates events the number of which corresponds to the count value of the event counter C2, going to step S760. Each of the events determines an activation timing for one of the individual control targets associated with engine control, such as an injector and/or an igniter for a corresponding one of the individual cylinders.

Otherwise, if it is determined that the count value of the event counter C2 is not greater than "0" (the determination in step S740 is NO), the CPU 10 goes to step S760 while skipping the instruction in step S750.

In step S760, the CPU 10 stores a threshold value in the threshold is register 26b. In the embodiment, the threshold value for the cam-edge interrupt task to be stored in the threshold register 26b is obtained based on:

a rotational angle of each of the first and second camshafts CM1 and CM2 from a change point P required to generate an event;

angular intervals at which the rotational position of each of the first and second camshafts CM1 and CM2 reaches one of TDCs of the individual cylinders; and the multiplication number f2 (1200).

The rotational angle of each of the first and second camshafts CM1 and CM2 from a change point P required to generate an event is determined to be "15 degrees crank angle" in the embodiment; this rotational angle will be referred to as "event generation interval".

The angular intervals at which the rotational position of each of the first and second camshafts CM1 and CM2 reaches one of TDCs of the individual cylinders is determined to be "120 degrees crank angle in the embodiment; this angular intervals will be referred to as "TDC angle".

Specifically, the threshold value for the cam-edge interrupt task is determined to be "15/(120/1200)=15×(1200/120)= 150". The threshold value "150" is stored in the threshold register 26b in step S760.

It is to be noted that, at the point of time when the execution of the instruction in step S760 is completed, the count value of the pass-angle measuring counter 26a represents the number of active edges, such as rising edges of the multiplication clock pulses of the multiplication clock between two temporally adjacent active edges of the cam-edge signal (input signal) at the respective change points P. The number of active edges (riding edges) of the multiplication clock pulses represents a rotation angle of each of the first and second cam shafts CM1 and CM2 between two temporally adjacent active edges of the cam-edge signal (input signal) at the respective change points P.

Thereafter, the CPU 10 rewrites the information stored in the enabling/disabling register 26c from the information indicative of "disabling" to information indicative of "enabling" in step S770. The information indicative of "enabling" permits the CPU 10 to launch a pass-angle interrupt task (a pass-angle interrupt program) described hereinafter in response to receiving an interrupt passed from the pass-angle measuring module 26. In contrast, the information indicative of "disabling" prevents the CPU 10 from launching the pass-angle interrupt task.

Next, the CPU 10 sets an event value to the event counter C2 in step S780. In the embodiment, the event value is given by dividing the TDC angle (120° CA) by the event interval (30° CA), which is determined to be "120/30"=4. The event value "4" is stored in the event counter C2 in step S780. After completion of execution of the instruction in step S780, the CPU 10 exits the cam-edge interrupt task.

Next, specific operations of the respective modules 20, 22, 24, 26, and 28 under control of the CPU 10 and variations of the parameters, such as the count values of the counters 22a, 28a, 28b, and 28c, will be described hereinafter with reference to FIGS. 14 and 16.

When the cam-edge interrupt program is launched first in response to a trigger active edge in the cam-edge signal (see E41 in FIG. 16), the cam-position determining flag holds the information indicative of the default of OFF and the count value of the guard counter 28b is incremented by 1×f from the default of "0" (see sections e40 and e41 in FIG. 16). For this reason, the determination in S610 is affirmative and the determination in step S620 is negative, so that execution of the CPU 10 is shifted to the instruction in step S670.

Because the count value of the guard counter 28b is set to "1×f", which is not to "0", the determination in step S670 is NO, so that execution of the CPU 10 goes to the instruction in step S700 via that in step S690.

At that time, because the instruction in step S630 is not executed so that no initial values are set to the respective counters 28a, 28b, and 28c, the determination in step S700 is NO, and thereafter, execution of the CPU 10 proceeds to step S720. This permits the default "1" of the at least one bit data stored in the register 20b to be kept, making it possible for the input selecting module 20 to continuously pass the cam-edge signal to the modules 22, 24, 26, 28, 32, and 34.

Next, in step S730, because the cam-position determining flag holds the information indicative of the default of OFF (the determination in step S730 is NO) the cam-edge interrupt task is exited.

Thereafter, when the next active edge appears in the cam-edge signal (see E42 in FIG. 16), the cam-position determining flag F2 holds the information indicative of the default of OFF and the count value of the guard counter 28b is incremented by 1×f from the count value "1×f" so as to become "2×f" (see sections e42 in FIG. 16). This allows the determination in step S620 to be affirmative.

After the affirmative determination in step S620, the initial values, which are determined based on the current active edge (E42) in the cam-edge signal and the table T, are stored in the corresponding counters 28a, 28b, and 28c, respectively in step S630. Specifically, the initial values of 3600 equivalent to "3×f", 4800 equivalent to "4×f", and 3600 equivalent to "3×f"

are stored, as their count values, in the reference counter 28*a*, the guard counter 28*b*, and the angular counter 28*c*, respectively (see the table T in FIG. 15).

After the execution of the instruction in step S630, the cam-position determining flag F2 is set to the information indicative of ON in step S640.

Thereafter, because the count value of the guard counter 28*b* is not set to "0", and the next active edge E43 appearing in the cam-edge signal does not correspond to the change point Q1, the instructions in steps S670, S690, S700, and S720 are sequentially executed by the CPU 10. Then, execution of the CPU 10 goes to step S730.

In step S730, because the current active edge E42 in the cam-edge signal does not correspond to the change point Q1 and the cam-position determining flag F2 is set to the information indicative of ON, the determination in step S730 is YES. Thus, execution of the CPU 10 is shifted to step S740.

In step S740, it is checked whether the count value of the event counter C2 is greater than "0".

Because the count value of the event counter C2 remains the default of "0", the instructions in steps S760, S770, and S780 are executed by the CPU 10 with the instruction in step S750 being skipped. This allows the parameters including the threshold value of the threshold register 26*b*, the information stored in the enabling/disabling register 26*c*, and the count value of the event counter C2 to be determined, and thereafter, the cam-edge interrupt task is exited.

Specifically, in the embodiment, as the threshold value, "150" is stored in the threshold register 26*b* in step S760, and the information indicative of "disabling" and stored in the enabling/disabling register 26*c* is changed to "enabling" in step S770. In addition, as the event value, "4" is stored in the event counter C2 in step S780.

Before an appearance of the next active edge E43 in the cam-edge signal (see the section e42 in FIG. 16), the information indicative of "enabling" allows the pass-angle measuring module 26 to output an interrupt in synchronization with a rising edge of each multiplication clock pulse appearing in the multiplication clock signal. The interrupt output from the pass-angle measuring module 26 is passed to the CPU 10 so that the CPU 10 executes a pass-angle interrupt task described hereinafter.

Thereafter, the next active edge B43 whose next active edge corresponds to the change point Q1 appears in the cam-edge signal (see FIG. 16).

The appearance of the active edge E43 in the cam-edge signal allows:

the initial values of 4800 equivalent to "4×f", 6000 equivalent to "6×f", and 4800 equivalent to "4×f" to be stored, as their count values, in the reference counter 28*a*, the guard counter 28*b*, and the angular counter 28*c*, respectively (see step S530 and the table T in FIG. 15); and the determination in step S600 to be affirmative.

The affirmative determination in S600 permits the at least one bit data of "1" stored in the register 20*b* to be changed to "0". This prevents the input selecting module 20 from passing the cam-edge signal to the modules 22, 24, 26, 28, and 32 (see step S710). Thereafter, execution of the CPU 10 goes to step S730.

At that time, the current active edge E43 in the cam-edge signal does not correspond to the change point Q1 and the cam-position determining flag F2 is set to the information indicative of ON. For this reason, the determination in step S730 is YES. Thus, execution of the CPU 10 is shifted to step S740.

Because the count value of the event counter C2 is cleared (zero) by the pass-angle interrupt task described hereinafter, the determination in step S740 is NO, so that the following instructions S760 to S780 are executed by the CPU 10, and thereafter, the cam-edge interrupt task is exited.

As described above, no cam-edge signal is passed to the modules 22, 24, 26, 28, 32, and 34 from the input selecting module 20 while the data stored in the register 20*b* represents "0". For this reason, no active edge Q1 appearing in the cam-edge signal is passed to the modules 22, 24, 26, 28, 32, and 34. This results in that the counters 22*a* and 26*a* continuously count up until the next active edge E44 after the active edge Q1 appears in the cam-edge signal (see a section e43 in FIG. 16).

When the next active edge E44 appears in the cam-edge signal, the count value of the guard counter 285 has been increased to reach "7200" since "6000" equal to (5×f) set in step S630 at the appearance of the active edge E43 in the cam-edge signal (see FIG. 16). Because the count value "7200" of the guard counter 28*b* is equal to the product of the multiplication number f2 (1200) and the number of cylinders, which is 6 in the embodiment, the determination in step S650 is YES. Thus, "0" is set to the count value of the guard counter 28*b* in step S660.

Thus, the determination in step S670 is YES, so that the reference counter 28*a* executes the count-up operation in the enabling mode in step S680.

Even if the count value of the guard counter 28*b* is set to "0" in step S660, because the operating mode of the reference counter 28*a* is set to the enabling mode in step S680, the reference counter 28*a* continuously counts up until the count value reaches the upper limit stored in the first register 28*d* (see a section e44 in FIG. 16).

Before an appearance of the next active edge E45 in the cam-edge signal (see the section e44 in FIG. 16), the information indicative of "enabling" allows the pass-angle measuring module 26 to output an interrupt in synchronization with a rising edge of each multiplication clock pulse appearing in the multiplication clock signal. The interrupt output from the pass-angle measuring module 26 is passed to the CPU 10 so that the CPU 10 executes the pass-angle interrupt task described hereinafter.

Thus, as described above, because the count value of the event counter C2 is cleared (zero) by the pass-angle interrupt task, the determination in step S740 is NO, so that the following instructions S760 to S780 are executed by the CPU 10 with the instruction S750 being skipped, and thereafter, the cam-edge interrupt task is exited.

When the next active edge (E45) appears in the crank signal (see FIG. 16), the count value of each of the reference counter 28*a* and the angular counter 28*c* reaches the upper limit "7200 (6×f)" stored in the first register 28*d* with the count value of the guard counter 28*b* remaining "0". This allows the count values of the reference counter 28*a* and the angular counter 28*c* to be cleared (zero) (see the section e44 in FIG. 16).

Thereafter, as described above, the instructions in steps S650, S670, S690, S700, S720, and S730 to S780 are repeatedly executed by the CPU 10 each time an active edge appears in the cam-edge signal until it is determined that an active edge immediately before a change point Q appears in the cam-edge signal (see sections e45 and e46 in FIG. 16).

During the repeat executions of the instructions in steps S650, S670, S690, S700, S720, and S730 to S780, when an active edge immediately before a change point Q appears in the cam-edge signal (the determination in step S700 is YES), the instruction in step S710 in place of that in step S720 is executed.

In addition, while the count value of the guard counter 28*b* is cleared (zero) each time it reaches the product of the multiplication number f2 (1200) and the number (6) of cylinders, the instructions in steps S650, S670, S690, S700, S720, and S730 to S780 are repeatedly executed by the CPU 10 (see sections e47 and e48).

(6) Pass-Angle Interrupt Task

A pass-angle interrupt task program will be described hereinafter with reference to FIG. 17. The instructions allow the CPU 10 to execute the pass-angle interrupt task each time an interrupt generated by the pass-angle measuring module 26 is input to the CPU 10 while the information stored in the enabling/disabling register 26c is set to information indicative of "enabling" in step S770.

Figure 17:
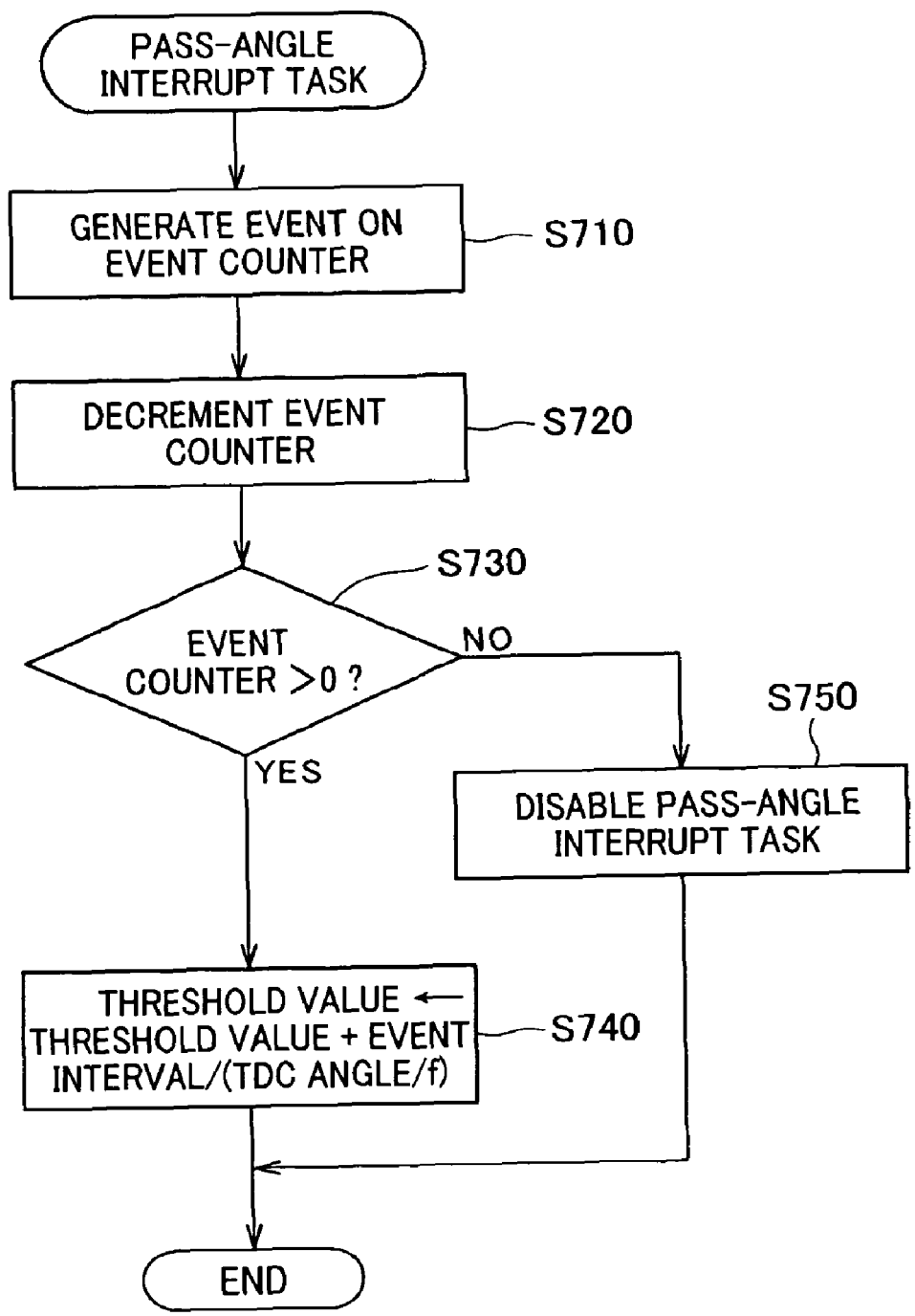
FIG. 17 is a flowchart schematically illustrating a pass-angle interrupt task to be executed by the CPU illustrated in FIG. 1.

When an interrupt input from the pass-angle measuring module 26 to the CPU 10 triggers to launch the pass-angle interrupt task program, the CPU 10 generates the number of events based on the count value of the event counter C2 in step S810 of FIG. 17. Each of these events determines an activation timing for one of the individual control targets associated with engine control, such as an injector and/or an igniter for a corresponding one of the individual cylinders. The event generating instruction in step S810 is similar to that in step S560 of FIG. 11.

Next, the CPU 10 decrements the count value of the event counter C2 by 1, and checks whether the count value of the event counter C2 exceeds "0" in step S830.

If it is determined that the count value exceeds "0" (the determination in step S830 is YES), the CPU 10 updates the threshold value stored in the threshold register 26b to a new one in step S840. In the embodiment, the CPU 10 overwrites the threshold value stored in the threshold register 26b with a new threshold value determined by:

dividing the TDC angle (120° CA) by the multiplication number f2 (1200) to obtain "120/1200";

dividing the event interval (30° CA) by "120/1200" to obtain "30/(120/1200)"; and adding the obtained value "30/(120/1200)" equal to 300 to the threshold value previously stored in the register 26b.

Specifically, the sum of the obtained value "300" and the threshold value stored in the register 26b is stored therein as a threshold value in step S840.

Otherwise if it is determined that the count value is equal to "0" (the determination in step S830 is NO), the CPU 10 rewrites the information stored in the enabling/disabling register 26c from the information indicative of "enabling" to information indicative of "disabling" in step S850. This prevents the pass-angle interrupt program from being launched even if an interrupt is input to the CPU 10.

Thereafter, the CPU 10 exits the pass-angle interrupt task.

As described above, in the cam-edge interrupt task, the threshold value of "150" the information indicative of "enabling", and the event value of "4" are respectively set to the threshold register 26b, the enabling/disabling register 26c, and the event counter C2 (see steps S760, S770, and S780).

Figure 18:
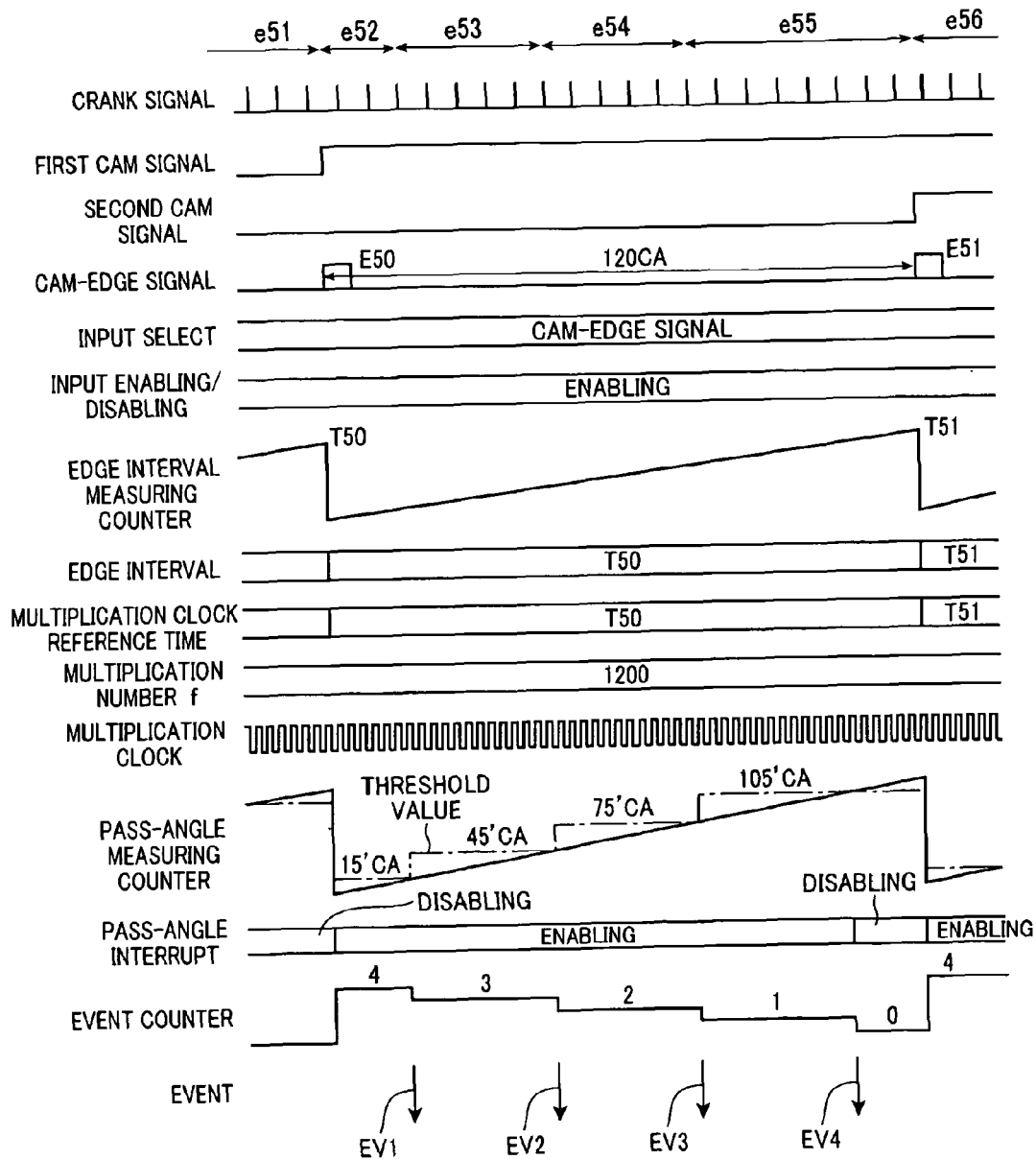
FIG. 18 is a time chart schematically illustrating variations of parameters of the angle clock generating unit with variation of the input signal during the cam-edge interrupt task illustrated in FIG. 14.

In this state, when the pass-angle measuring counter 26b is reset in synchronization with the appearance of an active edge (E50) in the cam-edge signal, the pass-angle measuring module 26 outputs an interrupt in synchronization with a rising edge of each multiplication clock pulse appearing in the multiplication clock signal (see a section e51 in FIG. 18).

Thereafter, the pass-angle interrupt task is executed by the CPU 10 each time an interrupt is input to the CPU 10 until the execution of the instruction in step S850 is completed.

Specific operations of the respective modules 20, 22, 24, 26, and 28 under control of the CPU 10 and variations of the parameters, such as the count values of the counters 26a and C2 and the threshold value stored in the threshold register 26b, will be described hereinafter with reference to FIGS. 17 to 19.

When the count value of the pass-angle measuring counter 26b reaches the threshold value of "150" stored in the threshold register 26c with rotation of each of the first and second camshafts CM1 and CM2 by 15° CA (see a section e52 in FIG. 18), an interrupt is generated by the pass-angle measuring module 26 to be input to the CPU 10, so that the pass-angle interrupt task is activated.

Upon activation of the pass-angle interrupt task, the count value of the event counter C2 is decremented from "4" to "3" in step S820 after events EV1 are generated in step S810 (see "EVENT" in FIG. 18). Because the count value "3" of the event counter C2 at that time is greater than "0", the determination in step S820 is affirmative, so that the threshold value "150" of the threshold register 26c is added to "300" so as to be updated to "450".

When the count value of the pass-angle measuring counter 26b reaches the threshold value of "450" stored in the threshold register 26c with rotation of each of the first and second camshafts CM1 and CM2 by 45° CA (see a section e53 in FIG. 18), an interrupt is generated by the pass-angle measuring module 26 to be input to the CPU 10, so that the pass-angle interrupt task is activated.

Upon activation of the pass-angle interrupt task, the count value of the event counter C2 is decremented from "3" to "2" in step S820 after events EV2 are generated in step S810. Because the count value "2" of the event counter C2 at that time is greater than "0", the determination in step S820 is affirmative, so that the threshold value "450" of the threshold register 26c is added to "300" so as to be updated to "750".

When the count value of the pass-angle measuring counter 26b reaches the threshold value of "750" stored in the threshold register 26c with rotation of each of the first and second camshafts CM 1 and CM2 by 75° CA (see a section e54 in FIG. 18), an interrupt is generated by the pass-angle measuring module 26 to be input to the CPU 10, so that the pass-angle interrupt task is activated.

Upon activation of the pass-angle interrupt task, the count value of the event counter C2 is decremented from "2" to "1" in step S820 after events EV3 are generated in step S810. Because the count value "1" of the event counter C2 at that time is greater than "0", the determination in step S820 is affirmative, so that the threshold value "750" of the threshold register 26c is added to "300", so as to be updated to "1050".

When the count value of the pass-angle measuring counter 26b reaches the threshold value of "1050" stored in the threshold register 26c with rotation of each of the first and second camshafts CM1 and CM2 by 105° CA (see a section e55 in FIG. 18), an interrupt IS generated by the pass-angle measuring module 26 to be input to the CPU 10, so that the pass-angle interrupt task is activated.

Upon activation of the pass-angle interrupt task, the count value of the event counter C2 is decremented from "1" to "0" in step S820 after events EV4 are generated in step S810.

When the count value of the event counter C2 is determined to become "0", the determination in step S830 is NO, so that the information indicative of "disabling" is stored in the enabling/disabling register 26c.

This prevents the pass-angle interrupt task from being activated until the information indicative of "enabling" is stored in the enabling/disabling register 26c in response to an appearance of the next active edge (E51) in the cam-edge signal 120° CA after the active edge E50 (see a section e55 in FIG. 18).

In addition, the pass-angle measuring counter 26b continuously counts up until the count value reaches "1200" corresponding to rotation of each of the first and second camshafts CM1 and CM2 by 120° CA. When the count value of the pass-angle measuring counter 26b reaches "1200", the appearance of the active edge E51 clears the count value of the pass-angle measuring counter 26b (see FIG. 18).

As described above, as illustrated in FIG. 18, at least one event in a limp home mode is generated by the pass-angle measuring interrupt task from a rotational position of the each camshaft 15° CA before a change point P ever time each camshaft rotates by the event interval of 30° CA (15° CA, 45° CA, 75° CA, and 105° CA). The events generated by the pass-angle measuring interrupt tasks permit the vehicle to be driven in the limp home mode.

Figure 14:
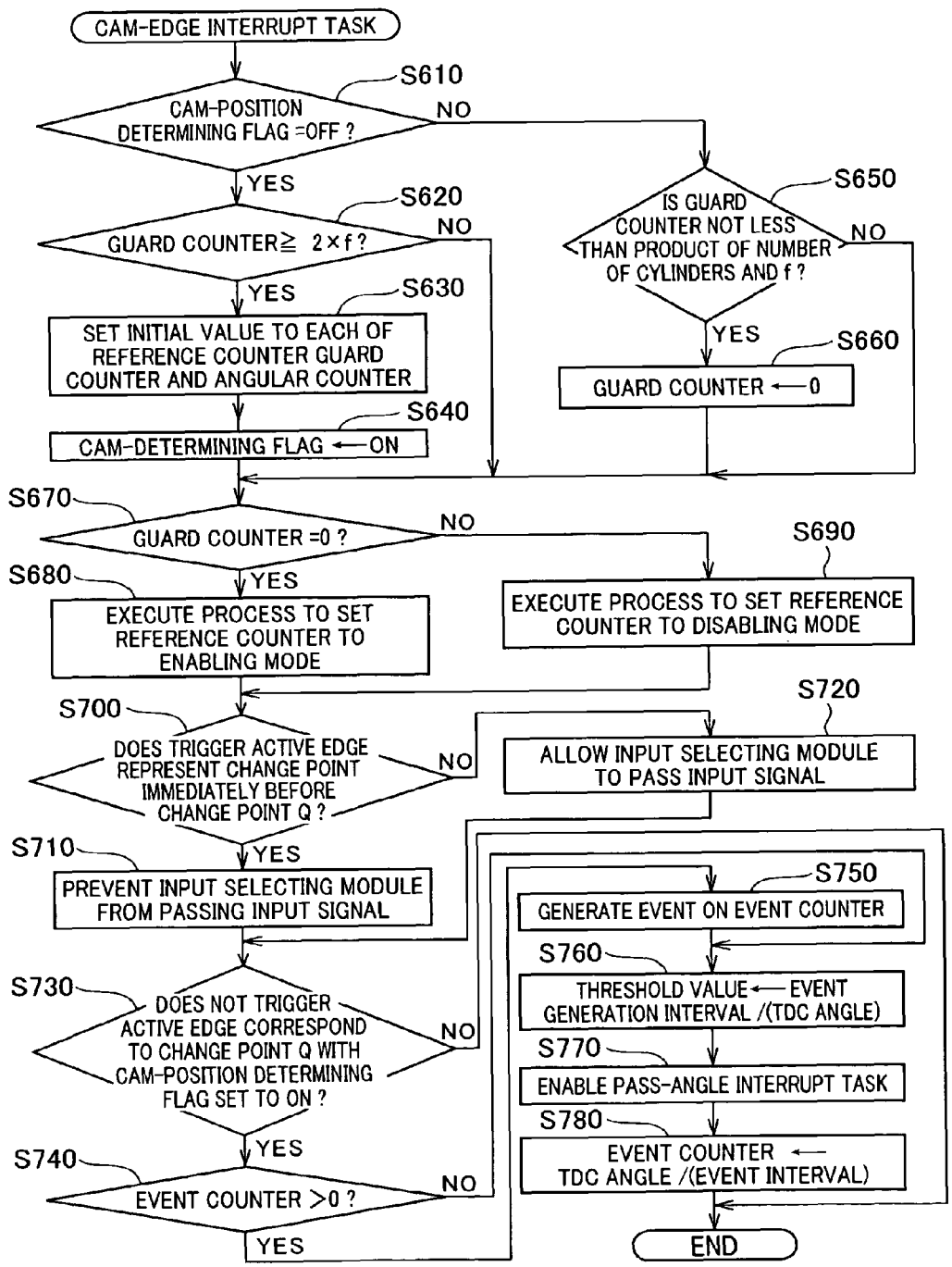
FIG. 14 is a flowchart schematically illustrating a cam-edge interrupt task to be executed by the CPU illustrated in FIG. 1.

It is to be noted that, in the cam-edge interrupt task, when it is determined that the determination in step S740 is YES, the CPU 10 generates the number of events based on the current count value of the event counter C2 in step S750 of FIG. 14.

As described above and illustrated in FIGS. 14, 17 and 18, in the pass-angle interrupt task to be executed by the CPU 10 in synchronization with an active edge in the cam-edge signal, it is assumed that each of the camshafts CM1 and CM2 rotates with temporally adjacent change points P kept constant of 120° CA. In this assumption, therefore, because the count value of the event counter C2 becomes "0" before the next active edge appears in the cam-edge signal, the determination in step S740 is constantly NO.

However, for examples it is assumed that the engine suddenly accelerates at the timing of an appearance of an active edge E52 in the crank signal so that a time interval between the active edge E52 and the next active edge E53 in the cam-edge signal becomes short as compared with normal time intervals of active edges therein.

Figure 19:
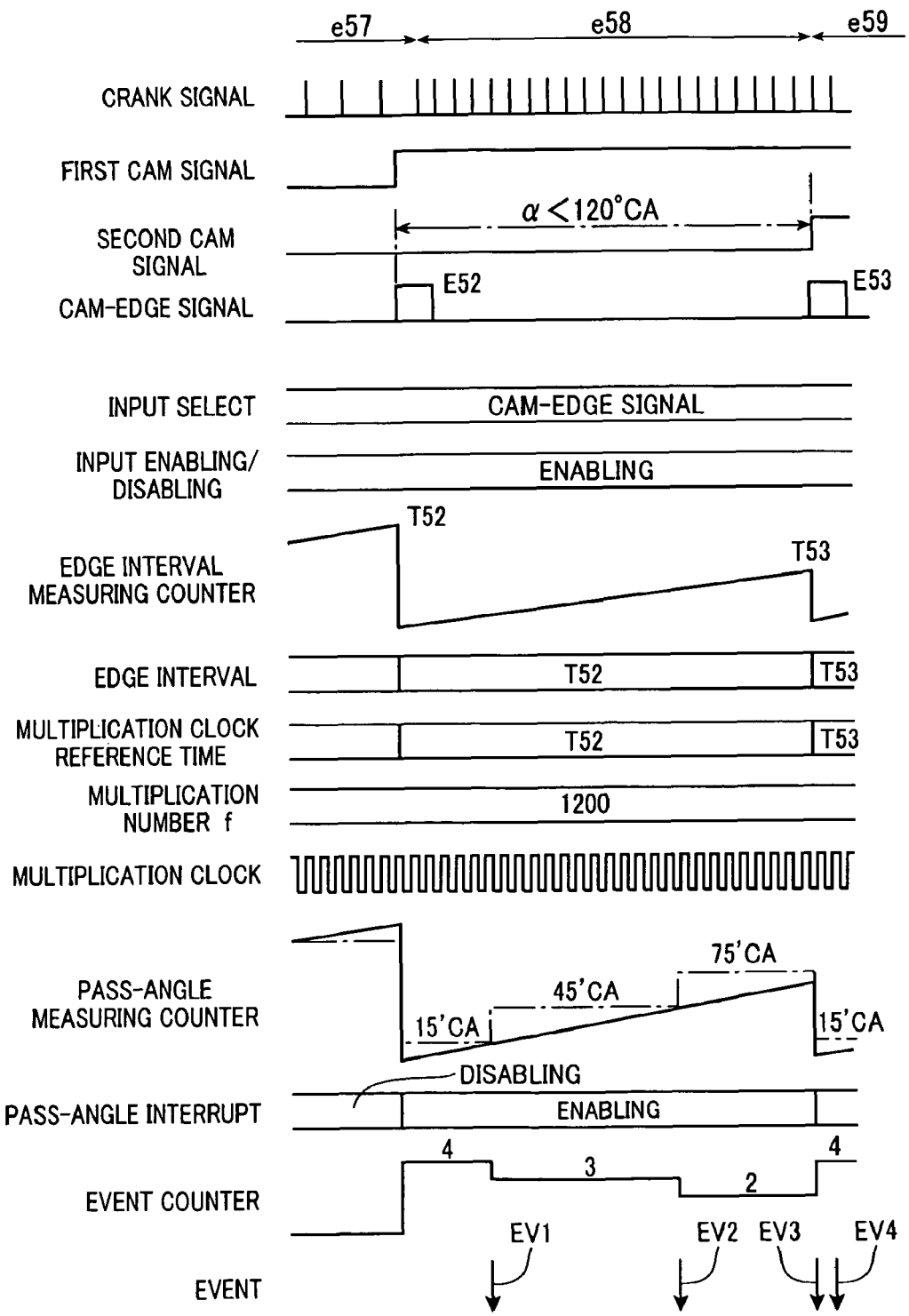
FIG. 19 is a time chart schematically illustrating variations of parameters of the angle clock generating unit with variation of the input signal during the cam-edge interrupt task illustrated in FIG. 14.

In this assumption, as illustrated in FIG. 19, the active edge E53 may appear in the cam-edge signal before the number of repetition of the pass-angle interrupt tasks reaches a predetermined number of "4" in the embodiment, in other words, before the count value of the even counter C2 does not reach "0". This may cause the determination in step S740 of FIG. 14 to be negative, which may reset, in steps S760 to S780, the parameters including the threshold value of the threshold register 26b, the information stored in the enabling/disabling register 26c, and the event value of the event counter C2.

This may cause some of events that the CPU 10 normally should generate during a time interval of the temporally adjacent active edges E52 and E53 not to be generated.

In addressing the problem, in the embodiment, when it is determined that the count value of the event counter C2 is not equal to "0" in step S740, the number of events are generated by the CPU 10 based on the current count value of the event counter C2 in step S750.

For example, in FIG. 19, when the count value of the event counter C2 is set to "2", the active edge E53 appears in the cam-edge signal due to the sudden acceleration of the vehicle. In this case, upon appearance of the active edge E53 in the cam-edge signal, the number "2" of events corresponding to the count value of the event counter C2 are generated by the CPU 10 (see sections e57 to e59 and EV4 in FIG. 19). This makes it possible to generate all events that the CPU 10 normally should generate during a time interval of temporally adjacent active edges in the cam-edge signal even when the engine suddenly accelerates.

As described above, the ECU 1 according to the embodiment works to, when detecting that the crank signal is abnormal (see NO in step S210 of FIG. 7), switch an input signal to be inputted to the input path from the crank signal to the cam-edge signal (see step S240 of FIG. 7). In addition, the ECU 1 works to generate various events associated with the engine control based on the cam-edge signal (see FIG. 14). Thus, the ECU 1 continues to control the engine irrespective the crank-signal failure to thereby allow the vehicle to be driven in a limp-home mode.

After the switch of an input signal from the crank signal to the cam-edge signal, the ECU 1 works to monitor the level change of the crank-input event signal without monitoring the input signal inputted through the input path (see step S250 of FIG. 7). Based on the result of the monitor, the ECU 1 determines whether an abnormality occurs in the crank signal.

The crank-input event signal has a level transiently varying in time in a predetermined same direction synchronized with a same-directed level variation of the crank signal. For is reason, monitoring of the level change of the crank-input event signal consequently means monitoring of the level change of the crank signal.

Thus, after the switching of an input signal inputted through the input path from the crank signal to the cam-edge signal, it is possible to continuously determine, based on the monitored level change of the crank-input signal, whether the crank signal is abnormally inputted in the same manner as before switching.

In the embodiment, when it is determined that no abnormalities occur in the crank signal, in other words, the crank signal is returned from the abnormal state to the normal state (step S210 of FIG. 7), the ECU 1 works to:

return an input signal inputted through the input path from the cam-edge signal to the crank signal (step S220 of FIG. 7); and return monitoring the level change of the crank-divided event signal obtained by dividing the crank signal (see step S230 of FIG. 7, and step S340 of FIG. 8).

This makes it possible to return the engine control to a normal state.

With the ECU 1 according to the embodiment, when the number of specified level changes in the crank signal during a period between one of the pulse-missing portions and the next one of the pulse-missing portions is out of a proper range, it is possible to determine that an abnormality occurs in the crank signal (see step S130 of FIG. 5). The proper range means an estimated range within which the number of proper specified-level changes (active edges) in the crank signal dung a period between one of the pulse-missing portions and the next one of the pulse-missing portions is.

In addition, the ECU 1 works to count the number of specified level changes in the crank-divided event signal in the input signal diagnosing task to thereby count a group of the number of specified level changes in the trigger signal each time the number of specified level changes occur in the trigger signal (see step S110 of FIG. 5).

The crank-divided event signal is obtained by dividing the crank signal by a dividing ratio. For this reason, if the ECU 1 counted the number of specified level changes in the crank-divided event signal as is, the count value would advance each time the number of specified level changes based on the dividing ratio occurs in the crank signal. This would result in that the count value is in agreement with a value obtained by thinning the number of specified level changes in the crank signal.

However, in the embodiment, the ECU 1 works to count by the number of dividing ratio each time a specified level change occurs in the trigger signal. This results in that the counted value of the trigger signal is matched with the value counted each time a specified level change occurs in the crank signal.

As described above, the ECU 1 is configured to count by the number of dividing ratio each time a specified level change occurs in the trigger signal.

The configuration allows the frequency of activation of the input signal diagnosing task for carrying out the count of the specified-level changes and the normal/abnormal determination to be reduced. Thus, it is possible to reduce the processing load required to repeatedly carry out the input signal diagnosing task.

After a failure has occurred in the crank signal, the ECU 1 counts the number of specified level changes in the crank-input event signal (see steps S210 to S250 of FIG. 7, and step S110 of FIG. 5). This relatively increases the frequency of activation of the input signal diagnosing task as compared with counting the number of specified level changes in the crank-divided event signal. This can immediately determine that no failures occur in the crank signal, in other words, the crank signal is returned to be normally inputted.

In the embodiment, when the number of specified level changes in the crank signal during a period between one of the pulse-missing portions and the next one of the pulse-missing portions is out of the proper range, it is possible to determine that an abnormality occurs in the crank signal (see step S130 of FIG. 5). In addition, when the number of specified level changes in the crank signal during the rotation of any one of the first and second cam shafts CM1 and CM2 by a specified angle is out of the proper range (see step S132 of FIG. 10), it is possible to determine that an abnormality occurs in the crank signal (see step S150 of FIG. 10).

In the embodiment, after it has been determined that an abnormality occurs in the crank signal, the unit count "1" is added to the active-edge count variable each time a specified level change appears in the crank-input event signal. That is, each time a specified level change appears in the crank-input event signal, the number of appearance of the specified level change is counted. This is because the crank-input event signal is synchronized with the crank signal.

However, each time a given number of specified level changes occur in the crank-input event signal, it is possible to count by the given number. In this modification, the frequency of activation of the input signal diagnosing task for the crank-input event signal is reduced, thus reducing the processing load required to repeatedly ca out the input signal diagnosing task.

In order to achieve such a purpose of reducing the processing load, the ECU 1 can be configured to output a modified crank-input event signal by dividing the crank signal by the dividing ratio identical to the dividing ratio used by the input dividing module 32.

In this modification, in step S110 of FIG. 5, the CPU 10 adds, to a value of a prepared "active-edge count variable", a fixed value, such as "1" independently of the type of the trigger signal (the crank signal or the crank-input event signal).

With the configuration of the modification, each time the number of specified level changes based on the dividing ratio appear in the trigger signal, a count value is incremented. That is, the count value is obtained by thinning the number of appearance of specified level changes in the crank signal by the number of dividing ratio.

However, because the crank-divided event signal is generated by similarly thinning the crank signal by the same dividing ratio, the input-signal diagnosing can be carried out without any trouble.

The configuration of the modification reduces the frequency of activation of the input signal diagnosing task, making it possible to reduce the processing load required to repeatedly execute the input signal diagnosing task.

In the embodiment, when a failure occurs in the crank signal, the cam-edge signal is used to generate the multiplication clock in place of the crank signal, but the present invention is not limited to the structure.

In the case of using the first cam signal in place of the crank signal, the edge interval measuring module 22 for example can measure a time interval between temporally adjacent active edges with regular angular intervals (at regular change points) in the first cam signal except for irregular change points with respect to the regular angular intervals.

Similarly, in the case of using the second cam signal in place of the crank signal, the edge interval measuring module 22 for example can measure a time interval between temporally adjacent active edges in the second cam signal with regular angular intervals (at regular change points) except for irregular change points with respect to the regular angular intervals.

It is surely that, if a cam signal having a level that repetitively changes in time each time a camshaft rotates by a constant angle, the edge interval measuring module 22 can directly use the cam signal to measure a time interval between temporally adjacent active edges in the cam signal.

It is to be noted that the multiplication number f2 for the cam-edge signal is obtained by:

calculating the product of the second angle of 120 degrees crank angle and the multiplication number 60 for the crank signal; and dividing the obtained product by the first angle.

That is, the multiplication number f2 for the cam-edge signal is determined to be "(120×60)/6=1200".

In other words, the relationship between the multiplication number f1 for the crank signal and the multiplication number f2 for the cam-edge signal is given by the following equation:

$$\frac{\alpha 1}{f1} = \frac{\alpha 2}{f2} \quad \text{[Equation 1]}$$

where α1 is the unit angle Δθ degrees, referred to as "first angle", and α2 is the 120 degrees crank angle, referred to as "second angle".

Specifically, the multiplication number f2 for the cam-edge signal is obtained to meet the equation 1.

In other words, in the embodiment, even though the input signal is changed from the crank signal to the cam-edge signal and the multiplication number is changed from the multiplication number f1 (60) for the crank signal to the multiplication number f2 (1200) for the cam-edge signal, the ratio of the multiplication number f1 (60) for the crank signal to the first angle is matched with that of the multiplication number f2 (1200) for the cam-edge signal to the second angle.

Specifically, the clock cycle of the multiplication clock generated by the multiplication clock generating module 24 is constant irrespective of changing the multiplication number f from the number f1 for the crank signal to the number f2 for the cam-edge signal and the time interval from a value corresponding to the first angle to that corresponding to the second angle. This is because the ratio of the multiplication number f1 (60) for the crank signal to the first angle is matched with that of the multiplication number f2 (1200) for the cam-edge signal to the second angle.

In other words, change of the multiplication number f from the number f1 for the crank signal to the number f2 for the cam-edge signal allows the clock cycle of the multiplication clock to be generated by the multiplication clock generating module 24 to be constant.

Specifically, the clock cycle of the multiplication clock to be used to operate the reference counter 28a and the angular counter 28c of the angle clock module 28 is kept constant before and after change of the input signal and the multiplication number f. This makes it unnecessary for the angle clock module 28 to execute specific tasks for switching its operations before and after change of the input signal and the multiplication number f.

This allows the ECU 1 to just change the input signal and the multiplication number to thereby continue engine control based on the cam-edge signal even when a failure occurs in the crank signal. This makes it unnecessary for the multiplication clock generating module 24, the angle clock module 28, and the timer output unit 14 to execute specific tasks for switching their operations after change of the input signal and the multiplication number f.

Accordingly, the ECU 1 allows, even if an error arises in the crank signal, the vehicle to be driven in a limp-home mode based on the engine control using the cam-edge signal without increasing hardware components and/or software components therein.

In the embodiment, the counters are designed to count up, but can be designed to count down.

The counters and the registers of the angle clock generating unit 12 can be implemented as hardwired logical circuits installed in the microcomputer 4.

At least part of each of the input circuit 2 and the output circuit 3 can be implemented as hardware logical circuits, software modules, or a hardware/software integrated system installed in the microcomputer 4.

The tasks (1) to (6) to be executed by the CPU 10 can be implemented as hardware logical circuits or a hardware/software integrated system.

In the embodiment, for example, the input selecting module 20 serves as both an input unit and an event signal generating unit, and the multiplication clock generating module 24 serves as a multiplication generating unit. In the embodiment, for example, the angle clock module 28 serves as a count unit, and the input signal diagnosing task serves as a monitoring unit.

Figure 11:
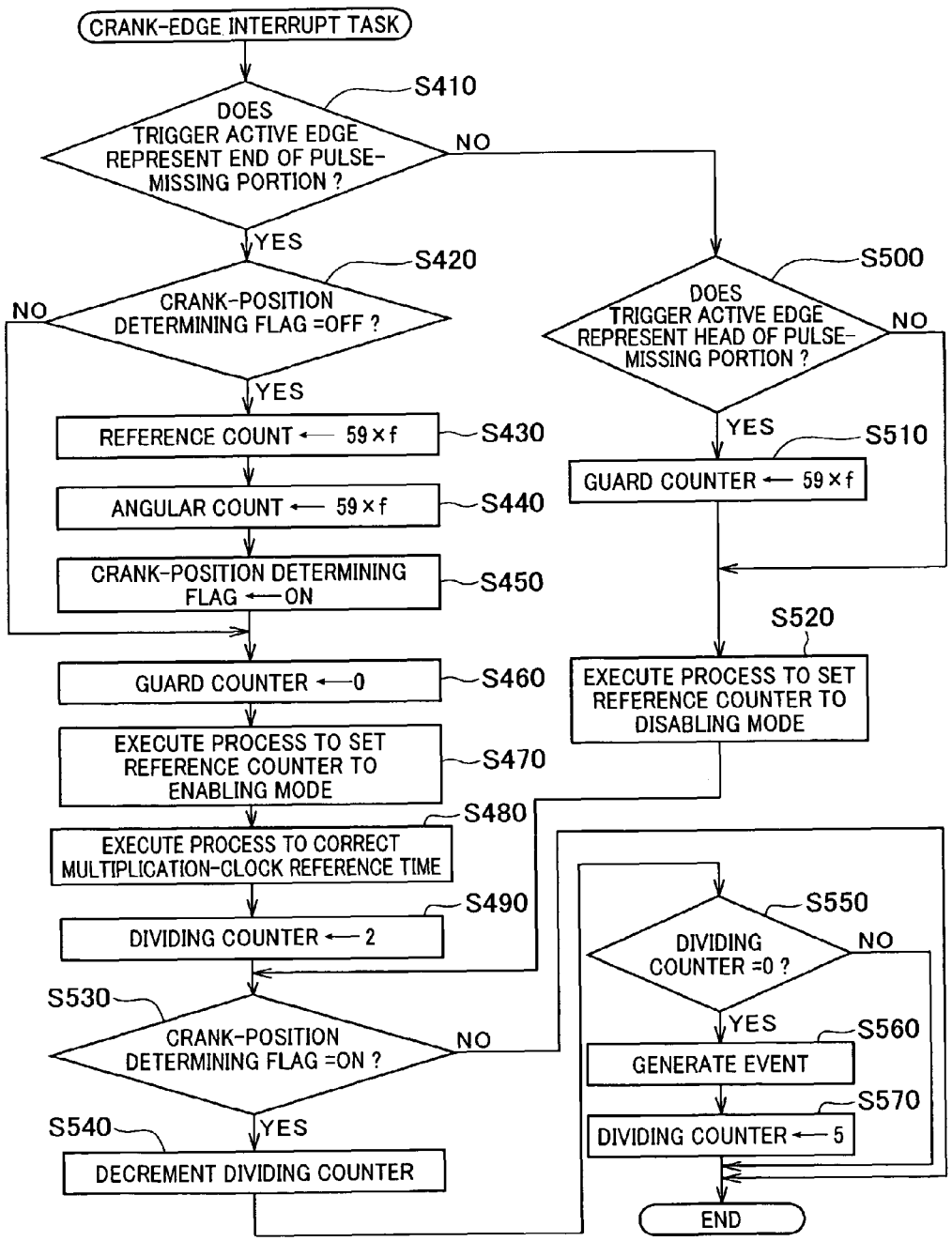
FIG. 11 is a flowchart schematically illustrating a crank-edge interrupt task to be executed by the CPU illustrated in FIG. 1.

In the embodiment, for example, the operation in step S560 of FIG. 11 and the operation in step S810 of FIG. 17 serve as an event generating unit, and the operation in step S130 of FIG. 5 and the operation in step S132 of FIG. 10 serve as an abnormality determining unit. In the embodiment, for example, the input-signal switching task serves as an input switching unit, and the dividing module 32 serves as a dividing module.

In the embodiment, for example, the operations in steps S110 and S120 of FIG. 5 serve as an interval measuring unit, and the operation in step S130 of FIG. 5 and the operation in step S320 of FIG. 8 serve as a missing region determining unit. In the embodiment, for example, the operations in steps S112 and S122 of FIG. 10 serve as a cam-change count unit.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. An apparatus for controlling an engine having a crankshaft and a camshaft, the apparatus comprising:
    an input unit configured to input a crank signal as an input signal to an input path, the crank signal having a level that repetitively changes in a predetermined direction each time the crankshaft rotates by a first unit angle;
    a multiplication clock generating unit configured to generate a first multiplication clock including a train of clock pulses whose clock cycle is determined by dividing, by a first multiplication number, the input signal;
    a count unit configured to count in synchronization with the first multiplication clock generated by the multiplication clock generating unit, a count value of the count unit corresponding to a rotational position of the crankshaft;
    an event generating unit configured to generate at least one event associated with control of the engine according to a crankshaft's rotational position identified by the count value of the count unit;
    a monitoring unit configured to monitor a level change of the input signal inputted through the input path;
    an abnormality determining unit configured to determine whether the crank signal is abnormal by comparing the monitored level change of the input signal with a normal level change of the input signal;
    an input switching unit configured to switch the input signal to be inputted to the input path from the crank signal to a cam signal when it is determined that the crank signal is abnormal, the cam signal having a level that repetitively changes in a predetermined direction each time the camshaft rotates by a second unit angle; and
    an event signal generating unit configured to generate a crank-input event signal while it is determined that the crank signal is abnormal by the abnormality determining unit, the crank-input event signal having a level that repetitively changes in a predetermined direction, each level change of the crank-input event signal being synchronized with a corresponding level change of the crank signal,
    the monitoring unit being configured to monitor a level change of the crank-input event signal while it is determined that the crank signal is abnormal by the abnormality determining unit.

2. The apparatus according to claim 1, wherein the monitoring unit is configured to count a number of predetermined-directed level changes in a target signal within a predetermined period, the target signal being any one of the input signal and the crank-input event signal, and
    the abnormality determining unit is configured to determine that the crank signal is abnormal when the counted number by the monitoring unit is out of a proper range, the proper range being a number of predetermined-directed level changes in the crank signal, the number of predetermined-directed level changes being estimated to be normal within the predetermined period.

3. The apparatus according to claim 2, further comprising:
    an input dividing unit configured to divide the input signal through the input path by a preset dividing ratio to thereby generate a crank-divided event signal, wherein the monitoring unit is configured to count, by a preset count value, a number of predetermined-directed level changes in the crank-divided event signal within a predetermined period, the preset count value corresponding to the dividing ratio.

4. The apparatus according to claim 2, wherein the crank signal includes:
   a normal region in which the predetermined-directed level changes appear each time the crank shaft rotates by the first unit angle; and
   a missing region in which an angular interval between one predetermined-directed level change at a predetermined rotational position of the crankshaft and a temporally next predetermined-directed level change is an integral multiple of the first unit angle, further comprising:
   an interval measuring unit configured to receive the crank signal as the input signal rough the input path, the interval measuring unit being configured to measure a time interval from when a predetermined-directed level change appears in the crank signal and a temporally next predetermined-directed level change appears therein; and
   a missing region determining unit configured to, when an actually measured value of the time interval is allowed to reach within the missing region, determine that the crank signal corresponds to the missing region,
   the monitoring unit being configured to repeatedly count a number of predetermined-directed level changes in the target signal within a preset period, the preset period being defined from when it has been determined that the crank signal corresponds to the missing region to when it is next determined that the crank signal corresponds to the missing region.

5. The apparatus according to claim 2, further comprising:
a cam-change count unit configured to repeatedly count a number of predetermined-directed level changes in the cam signal,
wherein the monitoring unit is configured to repeatedly count a number of predetermined-directed level changes in the target signal within a previously set period for which the counted number by the cam-change count unit has reached a predetermined count corresponding to a specified rotation angle of the cam shaft.

* * * * *